(12) United States Patent
Soane et al.

(10) Patent No.: US 8,349,188 B2
(45) Date of Patent: *Jan. 8, 2013

(54) SYSTEMS AND METHODS FOR REMOVING FINELY DISPERSED PARTICULATE MATTER FROM A FLUID STREAM

(75) Inventors: David Soane, Chestnut Hill, MA (US); William Ware, Jr., Hanover, NH (US); Robert P. Mahoney, Newbury, MA (US); Nathan Ashcraft, Somerville, MA (US)

(73) Assignee: Soane Mining, LLC, Cambridge, MA (US)

( * ) Notice: Subject to any disclaimer, the term of this patent is extended or adjusted under 35 U.S.C. 154(b) by 54 days.

This patent is subject to a terminal disclaimer.

(21) Appl. No.: 12/792,181

(22) Filed: Jun. 2, 2010

(65) Prior Publication Data
US 2011/0131873 A1 Jun. 9, 2011

Related U.S. Application Data

(63) Continuation-in-part of application No. 12/363,369, filed on Jan. 30, 2009.

(60) Provisional application No. 61/346,702, filed on May 20, 2010, provisional application No. 61/253,332, filed on Oct. 20, 2009, provisional application No. 61/246,585, filed on Sep. 29, 2009, provisional application No. 61/183,331, filed on Jun. 2, 2009, provisional application No. 61/140,525, filed on Dec. 23, 2008, provisional application No. 61/117,757, filed on Nov. 25, 2008, provisional application No. 61/028,717, filed on Feb. 14, 2008.

(51) Int. Cl.
*C02F 1/54* (2006.01)

(52) U.S. Cl. ........ 210/666; 210/679; 210/705; 210/727; 210/730; 210/735; 210/776; 210/787; 210/804; 210/806

(58) Field of Classification Search ................. 210/714, 210/767, 776, 787, 804, 806
See application file for complete search history.

(56) References Cited

U.S. PATENT DOCUMENTS
3,352,424 A * 11/1967 Guebert et al. ................. 502/62
(Continued)

FOREIGN PATENT DOCUMENTS
WO 2010098786 A1 9/2010

OTHER PUBLICATIONS

Zhang et al. "Development of an Ultra-fine Coal Dewatering Technology and an Integrated Flotation-Dewatering SYstem for Coal Preparation Plants". DOE Grant Final Report. Mar. 1, 2007.*

(Continued)

*Primary Examiner* — Joseph Drodge
(74) *Attorney, Agent, or Firm* — Elmore Patent Law Group, P.C.; Mahreen Chaudhry Hoda; Carolyn S. Elmore, Esq.

(57) ABSTRACT

Disclosed herein are systems for removing particulate matter from a fluid, comprising a particle functionalized by attachment of at least one activating group or amine functional group, wherein the modified particle complexes with the particulate matter within the fluid to form a removable complex therein. The particulate matter has preferably been contacted, complexed or reacted with a tethering agent. The system is particularly advantageous to removing particulate matter from a fluid waste stream following mining or ore processing operations.

45 Claims, 8 Drawing Sheets

U.S. PATENT DOCUMENTS

| | | | |
|---|---|---|---|
| 3,723,310 A * | 3/1973 | Lang et al. | 210/727 |
| 3,932,275 A * | 1/1976 | Mewes et al. | 210/712 |
| 4,346,010 A * | 8/1982 | Ogino et al. | 210/714 |
| 4,363,749 A * | 12/1982 | Weiss et al. | 502/80 |
| 4,498,993 A * | 2/1985 | Raba et al. | 210/710 |
| 4,569,768 A * | 2/1986 | McKinley | 210/727 |
| 4,882,066 A * | 11/1989 | Portier | 210/679 |
| 5,073,272 A * | 12/1991 | O'Neill et al. | 210/728 |
| 5,190,660 A * | 3/1993 | Lindoy et al. | 210/670 |
| 5,393,435 A | 2/1995 | Deans et al. | |
| 5,433,865 A | 7/1995 | Laurent | |
| 5,453,206 A * | 9/1995 | Browne | 210/711 |
| 5,543,056 A * | 8/1996 | Murcott et al. | 210/705 |
| 5,798,046 A * | 8/1998 | Greer et al. | 210/705 |
| 6,042,732 A * | 3/2000 | Jankowski et al. | 210/727 |
| 6,203,711 B1 * | 3/2001 | Moffett | 210/725 |
| 6,890,431 B1 * | 5/2005 | Eades et al. | 210/195.1 |
| 6,919,031 B2 | 7/2005 | Blumenschein et al. | |
| 7,255,793 B2 * | 8/2007 | Cort | 210/695 |
| 7,901,583 B2 | 3/2011 | McColl et al. | |
| 8,187,470 B2 * | 5/2012 | Wang et al. | 210/712 |
| 2002/0139754 A1 * | 10/2002 | Miller | 210/726 |
| 2004/0116304 A1 * | 6/2004 | Wu et al. | 507/100 |
| 2006/0151360 A1 | 7/2006 | Wright et al. | |
| 2007/0085055 A1 | 4/2007 | Sikes et al. | |
| 2009/0206040 A1 | 8/2009 | Berg et al. | |
| 2010/0098493 A1 | 4/2010 | McColl et al. | |
| 2012/0061321 A1 | 3/2012 | Soane et al. | |

OTHER PUBLICATIONS

U.S. Appl. No. 12/846,021, Soane et al.

U.S. Appl. No. 12/908,718, Soane et al.

Blumenschein, C. D., et al., "Sand Ballasted High Rate Clarification Process for Treatment of Process Water," available online at http://web.cecs.pdx.edu/~fishw/UO_Ballast-Actiflo.pdf. Oct. 2006.

"Actiflo™ Process : Key to Efficient High-Rate Clarification," available online at http://www.veoliawaterst.com/indepth/mining_fluent/13262,actiflo_process.htm.

Muylwyk, Q., et al., "Practical experiences in sand ballasted clarification processes," Proceedings of the Annual Conference of the Western Canada Water and Wastewater Association, Abstract (2004).

* cited by examiner and methods for removing finely dispersed particulate matter from fluid streams.

SYSTEMS AND METHODS FOR REMOVING FINELY DISPERSED PARTICULATE MATTER FROM A FLUID STREAM

RELATED APPLICATIONS

This application is a continuation-in-part of U.S. application Ser. No. 12/363,369, filed Jan. 30, 2009, which claims the benefit of U.S. Provisional Application No. 61/028,717, filed on Feb. 14, 2008, U.S. Provisional Application No. 61/117,757, filed on Nov. 25, 2008 and U.S. Provisional Application No. 61/140,525 filed on Dec. 23, 2008; this application also claims the benefit of U.S. Provisional Application No. 61/183,331 filed Jun. 2, 2009, U.S. Provisional Application No. 61/246,585 filed Sep. 29, 2009, U.S. Provisional Application No. 61/253,332 filed Oct. 20, 2009 and U.S. Provisional Application No. 61/346,702 filed May 20, 2010. The entire teachings of the above applications are incorporated herein by reference.

FIELD OF THE APPLICATION

The application relates generally to the use of particles for removing finely dispersed particulate matter from fluid streams.

BACKGROUND

Fine materials generated from mining activities are often found well-dispersed in aqueous environments, such as wastewater. The finely dispersed materials may include such solids as various types of clay materials, recoverable materials, fine sand and silt. Separating these materials from the aqueous environment can be difficult, as they tend to retain significant amounts of water, even when separated out, unless special energy-intensive dewatering processes or long-term settling practices are employed.

An example of a high volume water consumption process is the processing of naturally occurring ores. During the processing of such ores, colloidal particles, such as clay and mineral fines, are released into the aqueous phase often due to the introduction of mechanical shear associated with the hydrocarbon-extraction process. In addition to mechanical shear, alkali water is sometimes added during extraction, creating an environment more suitable for colloidal suspensions. A common method for disposal of the resulting "tailing" solutions, which contain fine colloidal suspensions of clay and minerals, water, sodium hydroxide and small amounts of remaining hydrocarbon, is to store them in "tailings ponds." These ponds take years to settle out the contaminating fines, posing severe environmental challenges. Tailings ponds or similar liquid retention areas can contain aqueous suspensions of fine particles from mining operations and other industrial operations, for example fine coal particles from coal mining and fly ash from coal combustion, with the potential for environmental damage and catastrophic leakage. It is desirable to identify a method for treating tailings from mining operations to reduce the existing tailings ponds, and/or to prevent their further expansion.

Certain mining processes use a large volume of water, placing strains on the local water supply. It would be advantageous, therefore, to reuse the water from tailings streams, so that there is less need for fresh water in the beneficiation process. In addition, certain mining processes can create waste streams of large-particle inorganic solids. This residue is typically removed in initial separation phases of processing due to its size, insolubility and ease of sequestering. Disposal or storage of this waste material represents a problem for the mining industry. It would be advantageous to modify this material so that it could be useful in-situ, for example as part of a treatment for the mining wastewater.

A typical approach to consolidating fine materials dispersed in water involves the use of coagulants or flocculants. This technology works by linking together the dispersed particles by use of multivalent metal salts (such as calcium salts, aluminum compounds or the like) or high molecular weight polymers such as partially hydrolyzed polyacrylamides. With the use of these agents, there is an overall size increase in the suspended particle mass; moreover, their surface charges are neutralized, so that the particles are destabilized. The overall result is an accelerated sedimentation of the treated particles. Following the treatment, though, a significant amount of water remains trapped with the sedimented particles. These technologies typically do not release enough water from the sedimented material that the material becomes mechanically stable. In addition, the substances used for flocculation/coagulation may not be cost-effective, especially when large volumes of wastewater require treatment, in that they require large volumes of flocculant and/or coagulant. While ballasted flocculation systems have also been described, these systems are inefficient in sufficiently removing many types of fine particles, such as those fine particles that are produced in wastewater from mining processes.

There remains an overall need in the art, therefore, for a treatment system that removes suspended particles from a fluid solution quickly, cheaply, and with high efficacy. It is also desirable that the treatment system yields a recovered (or recoverable) solid material that retains minimal water, so that it can be readily processed into a substance that is mechanically stable. It is further desirable that the treatment system yields clarified water that can be readily recycled for further industrial purposes.

An additional need in the art pertains to the management of existing tailings ponds. In their present form, they are environmental liabilities that may require extensive clean-up efforts in the future. It is desirable to prevent their expansion. It is further desirable to improve their existing state, so that their contents settle more efficiently and completely. A more thorough and rapid separation of solid material from liquid solution in the tailings pond could allow retrieval of recyclable water and compactable waste material, with an overall reduction of the footprint that they occupy.

SUMMARY

The present invention is directed to systems and methods for removing finely dispersed materials or particles from wastewater streams produced during mining operations.

In one embodiment, the invention is directed to a method of removing particulate matter from a waste tailing fluid, comprising: providing an activating material capable of being affixed to the particulate matter; affixing the activating material to the particulate matter to form an activated particle; providing an anchor particle and providing a tethering material capable of being affixed to the anchor particle; and attaching the tethering material to the anchor particle followed by attaching the tethering material to the activated particle to form a removable complex in the fluid; wherein the fluid is a waste tailing fluid derived from energy production or a mining process. In certain aspects, the mining process is coal mining or the mining of an inorganic ore. In additional aspects, the particulate matter is selected from the group consisting of coal combustion products, coal fines, clay particles and mineral particles. In an additional embodiment, the fluid is selected from the group consisting of red mud fluid stream, gangue, slurry containing fine particulate kaolin, tailings from trona mining and slurry produced by phosphate beneficiation. In certain aspects, the anchor particle comprises sand. In certain additional aspects, the tethering material is material is selected from the group consisting of chitosan, lupamin, branched polyethyleneimine (BPEI), polydimethyldiallylammonium chloride (PDAC), and polydiallyldimethylammonium chloride (pDADMAC). In some embodiments, the activated particle attaches to the tethering material by electrostatic interaction, hydrogen bonding or hydrophobic behavior. In some aspects, the anchor particle comprises a material indigenous to a mining process.

In an additional embodiment, the invention is a method of removing particulate matter from a fluid, comprising providing a modified particle comprising a particle functionalized by attachment of at least one amine functional group; dispersing the modified particle within the fluid so that it contacts the particulate matter to form a removable complex in the fluid; and removing the removable complex from the fluid wherein the fluid is a waste tailing fluid derived from energy production or a mining process.

In a further aspect, the invention is directed to a system for removing coal fines from a fluid, comprising: a fluid containing a population of suspended coal fines; an activator polymer added to the fluid to complex with the suspended coal fines to form activated coal fines, the activated coal fines residing within the fluid volume; an anchor particle complexed with a tethering agent to form tether-bearing anchor particles, the tether-bearing anchor particles being mixed with the fluid volume to contact the activated coal fines, the tether-bearing anchor particles being capable of complexing with the activated coal fines to form complexes removable from the fluid, wherein the complexes removable from the fluid comprise a composite material comprising complexed coal fines and anchor particles. In some embodiments, the anchor particle comprises coal. In additional embodiments, the anchor particle comprises a non-combustible material. In yet additional aspects, the anchor particle comprises a mineral.

The invention also encompasses a method for removing coal fines from a fluid, comprising: providing an activator polymer capable of interacting with a population of coal fines suspended in a fluid; adding the activator polymer to the population to form activated coal fines; providing an anchor particle; complexing the anchor particle with a tethering agent capable of complexing with the activated coal fines, thereby forming tether-bearing anchor particles; mixing the tether-bearing anchor particles with the activated coal fines to form a complex removable from the fluid, the complex comprising a composite material comprising coal fines and anchor particles, and removing the composite material from the fluid. In some embodiments, the anchor particle comprises coal. In additional embodiments, the anchor particle comprises a non-combustible material. In some embodiments, the anchor particle comprises a combustible material. In yet additional aspects, the anchor particle comprises a mineral. In certain other aspects, anchor particle comprises a starch particle. The invention additionally encompasses an energy-bearing pellet produced according to this method. In some aspects, the energy-bearing pellet comprises a composite material comprising activated coal fines complexed to combustible tether-bearing anchor particles. In additional aspects, the energy-bearing pellet comprises a composite material comprising an energy-containing fine material and a combustible anchor particle in a complex, the complex further comprising an interacting pair of polyelectrolytes, wherein the first of the pair of polyelectrolytes is bound to the energy-containing fine material and the second of the pair of polyelectrolytes is bound to the combustible anchor particle.

In some embodiments, the removable complex formed by a method of the invention is removed by a process selected from the group consisting of filtration, centrifugation, skimming and gravitational settling.

In yet another embodiment, the invention is a system for removing particulate matter from a fluid, comprising an activating material capable of being affixed to the particulate matter to form an activated particle; a tether-bearing anchor particle capable of attaching to the activated particle to form a removable complex in the fluid; and a separator for separating the removable complex from the fluid, thereby removing the particulate matter; wherein the fluid is a waste tailing fluid derived from energy production or a mining process.

DETAILED DESCRIPTION

Figure 1:
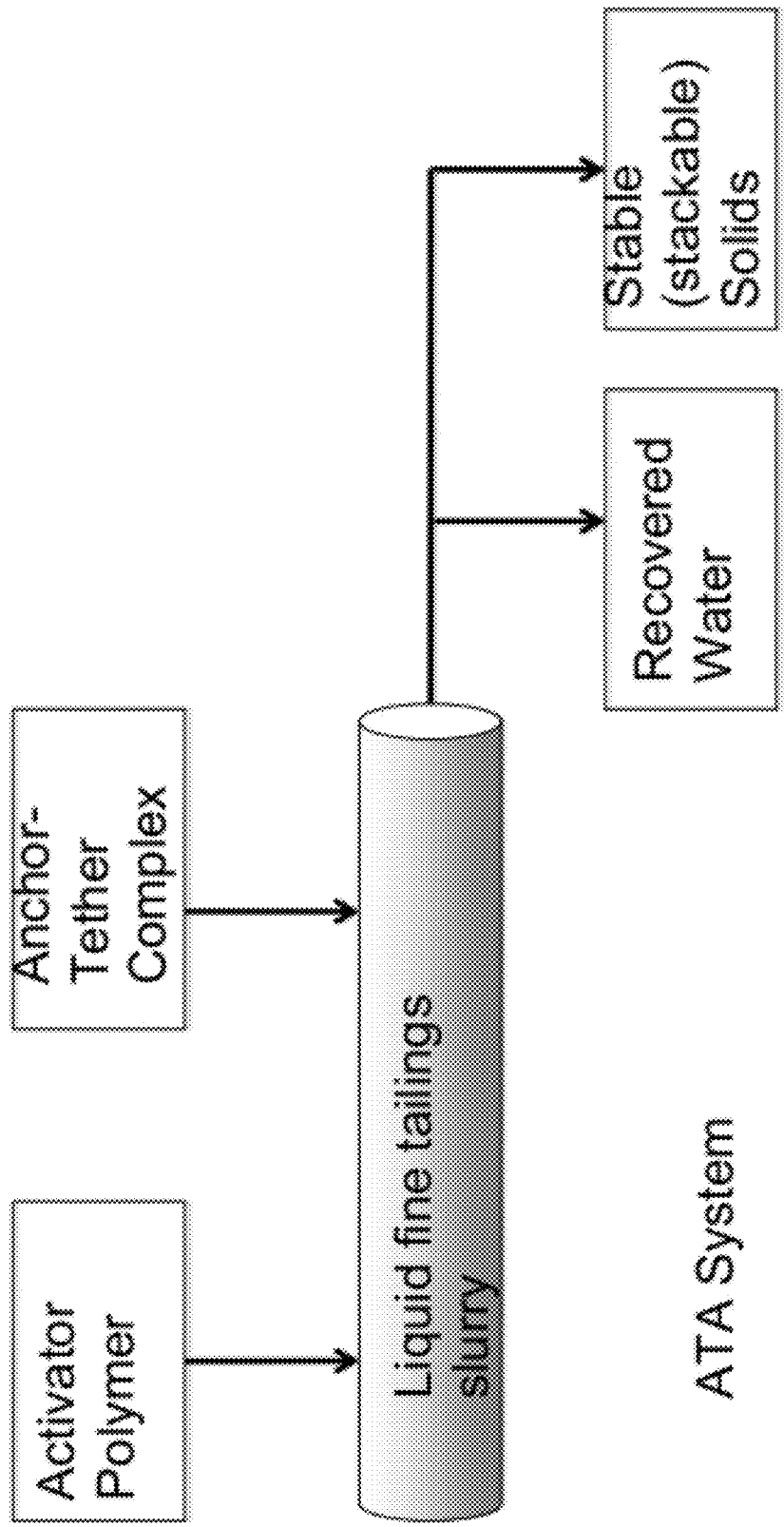
FIG. 1 is a schematic showing the activated-tethered-anchored (ATA) system comprising three basic components: an activator polymer, a tether polymer and an anchor particle; the ATA system is contacted with the liquid fine tailing slurry resulting in self-assembly of the solid material and the expulsion of water.
Figure 2:
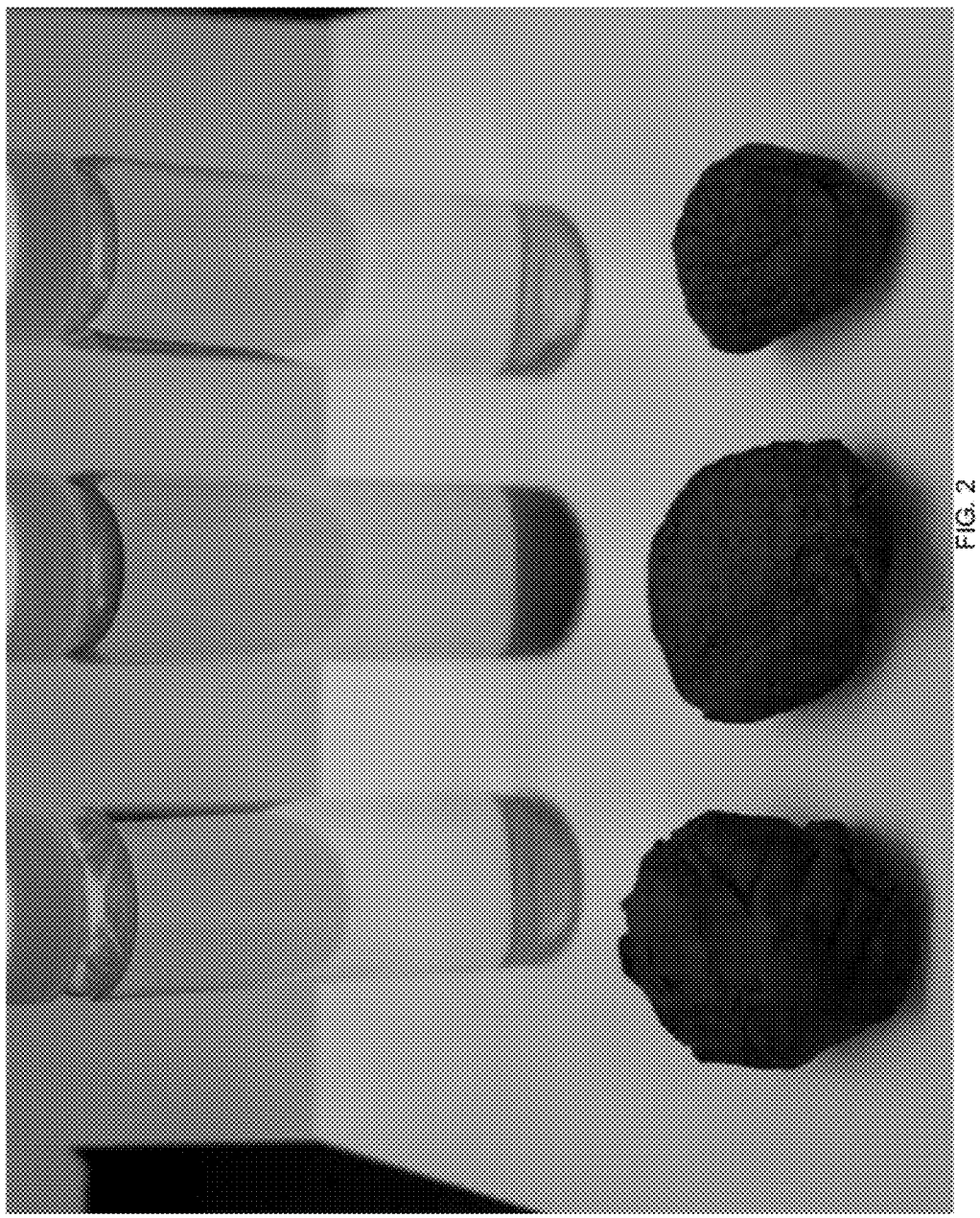
FIG. 2 is a reproduction of a photograph showing filtrates of and solid material filtered from samples containing activated coal slurry treated with tethered filter cake (FC) and two samples of coal processed refuse (CPR1 and CPR2).

Disclosed herein are systems and methods for removing finely dispersed materials or "fines" from wastewater streams produced during mining operations. In embodiments, the clay fines produced during phosphate beneficiation can be removed with these systems and methods. In embodiments, other types of fines can be removed where these contaminants are suspended in aqueous solutions.

These systems and methods employ three subprocesses: (1) the "activation" of the wastewater stream bearing the fines by exposing it to a dose of a flocculating polymer that attaches to the fines; (2) the preparation of "anchor particles," fine particles such as sand by treating them with a "tether" polymer that attaches to the anchor particles; and (3) adding the tether-bearing anchor particles to the activated wastewater stream containing the fines, so that the tether-bearing anchor particles form complexes with the activated fines. The activator polymer and the tether polymer have been selected so that they have a natural affinity with each other. Combining the activated fines with the tether-bearing anchor particles rapidly forms a solid complex that can be separated from the suspension fluid with a separator, resulting in a stable mass that can be easily and safely stored, along with clarified water that can be used for other industrial purposes. As used herein, the term "separator" refers to any mechanism, device, or method that separates the solid complex from the suspension fluid, i.e., that separates the removable complexes of tether-bearing anchor particle and activated particles from the fluid. Following the separation process, the stable mass can be used for beneficial purposes, as can the clarified water. As an example, the clarified water could be recycled for use on-site in further processing and beneficiation of ores. As an example, the stable mass could be used for construction purposes at the mine operation (roads, walls, etc.), or could be used as a construction or landfill material offsite. Dewatering to separate the solids from the suspension fluid can take place in seconds, relying only on gravity filtration.

Disclosed herein are systems and methods for enhancing the settlement rate of dispersed fine materials by incorporating them within a coarser particulate matrix, so that solids can be removed from aqueous suspension as a material having mechanical stability. The systems and methods disclosed herein involve three components: activating the fine particles, tethering them to anchor particles, and sedimenting the fine particle-anchor particle complex.

Generally speaking, the fines in the wastewater stream are "activated" by exposure to a dosing of flocculating polymer. Separately, the sand particles or other "anchor" particles are exposed to a polymer "tether." The activator and tether are chosen so they have a natural affinity towards each other. Combining the two streams, the activated fines with tether-bearing anchors, produces a stable solid that forms rapidly. The solid can be separated from the clarified water in which it resides by a dewatering process, for example by gravity filtration, which can quickly yield a mass that can be easily and safely stored.

1. Activation

As used herein, the term "activation" refers to the interaction of an activating material, such as a polymer, with suspended particles in a liquid medium, such as an aqueous solution. In embodiments, high molecular weight polymers can be introduced into the particulate dispersion, so that these polymers interact, or complex, with fine particles. The polymer-particle complexes interact with other similar complexes, or with other particles, and form agglomerates.

This "activation" step can function as a pretreatment to prepare the surface of the fine particles for further interactions in the subsequent phases of the disclosed system and methods. For example, the activation step can prepare the surface of the fine particles to interact with other polymers that have been rationally designed to interact therewith in an optional, subsequent "tethering" step, as described below. Not to be bound by theory, it is believed that when the fine particles are coated by an activating material such as a polymer, these coated materials can adopt some of the surface properties of the polymer or other coating. This altered surface character in itself can be advantageous for sedimentation, consolidation and/or dewatering. In another embodiment, activation can be accomplished by chemical modification of the particles. For example, oxidants or bases/alkalis can increase the negative surface energy of particulates, and acids can decrease the negative surface energy or even induce a positive surface energy on suspended particulates. In another embodiment, electrochemical oxidation or reduction processes can be used to affect the surface charge on the particles. These chemical modifications can produce activated particulates that have a higher affinity for tethered anchor particles as described below.

Particles suitable for modification, or activation, can include organic or inorganic particles, or mixtures thereof Inorganic particles can include one or more materials such as calcium carbonate, dolomite, calcium sulfate, kaolin, talc, titanium dioxide, sand, diatomaceous earth, aluminum hydroxide, silica, other metal oxides and the like. Sand or other fine fractions of the solids, such as sand recovered from the mining process itself, is preferred. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, may comprise materials such as lignocellulosic material, cellulosic material, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In embodiments, the particle can be substantially larger than the fine particulates it is separating out from the process stream. For example, for the removal of particulate matter with approximate diameters less than 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be advantageously used as the particle to be modified for removing particulate matter from the waste stream of phosphate mining, because sand is a byproduct of phosphate beneficiation and is therefore found abundantly at phosphate mining sites.

In embodiments, plastic materials may be used as particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include polyether polyurethanes and polyester polyurethanes. Plastics may also be obtained for these uses from waste plastic, such as post-consumer waste including plastic bags, containers, bottles made of high density polyethylene, polyethylene grocery store bags, and the like.

In embodiments, plastic particles can be formed as expandable polymeric pellets. Such pellets may have any geometry useful for the specific application, whether spherical, cylindrical, ovoid, or irregular. Expandable pellets may be pre-expanded before using them. Pre-expansion can take place by heating the pellets to a temperature above their softening point until they deform and foam to produce a loose composition having a specific density and bulk. After pre-expansion, the particles may be molded into a particular shape and size. For example, they may be heated with steam to cause them to fuse together into a lightweight cellular material with a size and shape conforming to the mold cavity. Expanded pellets may be 2-4 times larger than unexpanded pellets. As examples, expandable polymeric pellets may be formed from polystyrenes and polyolefins. Expandable pellets are available in a variety of unexpanded particle sizes. Pellet sizes, measured along the pellet's longest axis, on a weight average basis, can range from about 0.1 to 6 mm.

In embodiments, the expandable pellets may be formed by polymerizing the pellet material in an aqueous suspension in the presence of one or more expanding agents, or by adding the expanding agent to an aqueous suspension of finely subdivided particles of the material. An expanding agent, also called a "blowing agent," is a gas or liquid that does not dissolve the expandable polymer and which boils below the softening point of the polymer. Blowing agents can include lower alkanes and halogenated lower alkanes, e.g., propane, butane, pentane, cyclopentane, hexane, cyclohexane, dichlorodifluoromethane, and trifluorochloromethane, and the like. Depending on the amount of blowing agent used and the technique for expansion, a range of expansion capabilities exist for any specific unexpanded pellet system. The expansion capability relates to how much a pellet can expand when heated to its expansion temperature. In embodiments, elastomeric materials can be used as particles. Particles of natural or synthetic rubber can be used, for example.

In embodiments, the particle can be substantially larger than the fine particulates it is separating out from the process stream. For example, for the removal of particulate matter with approximate diameters less than 50 microns, particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be used as the particle to be modified for removing particulate matter from the waste stream (tailings) in phosphate mining or other mining activities.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

The "activation" step may be performed using flocculants or other polymeric substances. Preferably, the polymers or flocculants can be charged, including anionic or cationic polymers. In embodiments, anionic polymers can be used, including, for example, olefinic polymers, such as polymers made from polyacrylate, polymethacrylate, partially hydrolyzed polyacrylamide, and salts, esters and copolymers thereof (such as (sodium acrylate/acrylamide) copolymers) polyacrylic acid, polymethacrylic acid, sulfonated polymers, such as sulfonated polystyrene, and salts, esters and copolymers thereof, and the like. Suitable polycations include: polyvinylamines, polyallylamines, polydiallyldimethylammoniums (e.g., thepolydiallyldimethylammonium chloride, branched or linear polyethyleneimine, crosslinked amines (including epichlorohydrin/dimethylamine, and epichlorohydrin/alkylenediamines), quaternary ammonium substituted polymers, such as (acrylamide/dimethylaminoethylacrylate methyl chloride quat) copolymers and trimethylammoniummethylene-substituted polystyrene, polyvinylamine, and the like. Nonionic polymers suitable for hydrogen bonding interactions can include polyethylene oxide, polypropylene oxide, polyhydroxyethylacrylate, polyhydroxyethylmethacrylate, and the like. In embodiments, an activator such as polyethylene oxide can be used as an activator with a cationic tethering material in accordance with the description of tethering materials below. In embodiments, activator polymers with hydrophobic modifications can be used. Flocculants such as those sold under the trademark MAGNAFLOC® by Ciba Specialty Chemicals can be used.

In embodiments, activators such as polymers or copolymers containing carboxylate, sulfonate, phosphonate, or hydroxamate groups can be used. These groups can be incorporated in the polymer as manufactured; alternatively they can be produced by neutralization of the corresponding acid groups, or generated by hydrolysis of a precursor such as an ester, amide, anhydride, or nitrile group. The neutralization or hydrolysis step could be done on site prior to the point of use, or it could occur in situ in the process stream.

The activated particle can also be an amine functionalized or modified particle. As used herein, the term "modified particle" can include any particle that has been modified by the attachment of one or more amine functional groups as described herein. The functional group on the surface of the particle can be from modification using a multifunctional coupling agent or a polymer. The multifunctional coupling agent can be an amino silane coupling agent as an example. These molecules can bond to a particle surface (e.g., metal oxide surface) and then present their amine group for interaction with the particulate matter. In the case of a polymer, the polymer on the surface of the particles can be covalently bound to the surface or interact with the surface of the particle and/or fiber using any number of other forces such as electrostatic, hydrophobic, or hydrogen bonding interactions. In the case that the polymer is covalently bound to the surface, a multifunctional coupling agent can be used such as a silane coupling agent. Suitable coupling agents include isocyano silanes and epoxy silanes as examples. A polyamine can then react with an isocyano silane or epoxy silane for example. Polyamines include polyallyl amine, polyvinyl amine, chitosan, and polyethylenimine.

In embodiments, polyamines (polymers containing primary, secondary, tertiary, and/or quaternary amines) can also self-assemble onto the surface of the particles or fibers to functionalize them without the need of a coupling agent. For example, polyamines can self-assemble onto the surface of the particles through electrostatic interactions. They can also be precipitated onto the surface in the case of chitosan for example. Since chitosan is soluble in acidic aqueous conditions, it can be precipitated onto the surface of particles by suspending the particles in a chitosan solution and then raising the solution pH.

In embodiments, the amines or a majority of amines are charged. Some polyamines, such as quaternary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

The polymers and particles can complex via forming one or more ionic bonds, covalent bonds, hydrogen bonding and combinations thereof, for example. Ionic complexing is preferred.

To obtain activated fine materials, the activator could be introduced into a liquid medium through several different means. For example, a large mixing tank could be used to mix an activating material with tailings from mining operations that contain fine particulate materials. Alternatively, the activating material can be added along a transport pipeline and mixed, for example, by a static mixer or series of baffles. Activated particles are produced that can be treated with one or more subsequent steps of tethering and anchor-separation.

The particles that can be activated are generally fine particles that are resistant to sedimentation. Examples of particles that can be filtered in accordance with the invention include metals, sand, inorganic, or organic particles. The particles are generally fine particles, such as particles having a mass mean diameter of less than 50 microns or particle fraction that remains with the filtrate following a filtration with, for example, a 325 mesh filter. The particles to be removed in the processes described herein are also referred to as "fines."

2. Tethering

As used herein, the term "tethering" refers to an interaction between an activated fine particle and an anchor particle (for example, as described below). The anchor particle can be treated or coated with a tethering material. The tethering material, such as a polymer, forms a complex or coating on the surface of the anchor particles such that the tethered anchor particles have an affinity for the activated fines. In embodiments, the selection of tether and activator materials is intended to make the two solids streams complementary so that the activated fine particles become tethered, linked or otherwise attached to the anchor particle. When attached to activated fine particles via tethering, the anchor particles enhance the rate and completeness of sedimentation or removal of the fine particles from the fluid stream.

In accordance with these systems and methods, the tethering material acts as a complexing agent to affix the activated particles to an anchor material. In embodiments, sand can be used as an anchor material, as may a number of other substances, as set forth in more detail below. In embodiments, a tethering material can be any type of material that interacts strongly with the activating material and that is connectable to an anchor particle.

As used herein, the term "anchor particle" refers to a particle that facilitates the separation of fine particles. Generally, anchor particles have a density that is greater than the liquid process stream. For example, anchor particles that have a density of greater than 1.3 g/cc can be used. Additionally or alternatively, the density of the anchor particles can be greater than the density of the fine particles or activated particles. Alternatively, the density is less than the dispersal medium, or density of the liquid or aqueous stream. Alternatively, the anchor particles are simply larger than the fine particles being removed. In embodiments, the anchor particles are chosen so that, after complexing with the fine particulate matter, the resulting complexes can be removed via a skimming process rather than a settling-out process, or they can be readily filtered out or otherwise skimmed off. In embodiments, the anchor particles can be chosen for their low packing density or potential for developing porosity. A difference in density or particle size can facilitate separating the solids from the medium.

For example, for the removal of particulate matter with an approximate mass mean diameter less than 50 microns, anchor particles may be selected having larger dimensions, e.g., a mass mean diameter of greater than 70 microns. An anchor particle for a given system can have a shape adapted for easier settling when compared to the target particulate matter: spherical particles, for example, may advantageously be used as anchor particles to remove particles with a flake or needle morphology. In other embodiments, increasing the density of the anchor particles may lead to more rapid settlement. Alternatively, less dense anchors may provide a means to float the fine particles, using a process to skim the surface for removal. In this embodiment, one may choose anchor particles having a density of less than about 0.9 g/cc, for example, 0.5 g/cc, to remove fine particles from an aqueous process stream.

Advantageously, anchor particles can be selected that are indigenous to a particular geographical region where the particulate removal process would take place. For example, sand can be used as the anchor particle for use in removing fine particulate matter from the waste stream (tailings) of phosphate mining.

Suitable anchor particles can be formed from organic or inorganic materials, or any mixture thereof. Particles suitable for use as anchor particles can include organic or inorganic particles, or mixtures thereof. In referring to an anchor particle, it is understood that such a particle can be made from a single substance or can be made from a composite. For example, coal can be used as an anchor particle in combination with another organic or inorganic anchor particle. Any combination of inorganic or organic anchor particles can be used. Anchor particle combinations can be introduced as mixtures of heterogeneous materials. Anchor particles can be prepared as agglomerations of heterogeneous materials, or other physical combinations thereof. For example, an anchor particle can be formed from a particle of one type of biomass combined with a particle of another type of biomass. In another example, an anchor particle can be formed from a combustible organic particle complexed, coated or otherwise admixed with other organic or inorganic anchor particle materials. As an example, a combustible organic material can be combined with particles of ungelatinized starch. In embodiments, the starch can be gelatinized during a thermal drying step, optionally with the use of an alkali, to cause binding and strengthening of the composite fuel product.

In embodiments, the organic material selected as an anchor particle can be a coal particle, for example coal derived from coal mining or processing. As an example, coal that is collected as filter cake (FC) coal can be used as anchor particles. This technology has the advantage of using materials that are readily available on-site during coal processing to treat the fines being produced there. Anchor particles can be energy-bearing (e.g., combustible) or non-energy-bearing (e.g., minerals), or combinations thereof.

In accordance with these systems and methods, inorganic anchor particles can include one or more materials such as calcium carbonate, dolomite, calcium sulfate, kaolin, talc, titanium dioxide, sand, diatomaceous earth, aluminum hydroxide, silica, other metal oxides and the like. In embodiments, the coarse fraction of the solids recovered from the mining process itself can be used for anchor particles, for example, coal from coal mining. Organic particles can include one or more materials such as biomass, starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, can comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants. Organic materials can include various forms of organic waste, including biomass and including particulate matter from post-consumer waste items such as old tires and carpeting materials.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In other embodiments, the inorganic material selected as an anchor particle can be produced during coal preparation and processing, as described above. For example, the inorganic material used as an anchor particle can be derived from the mineral waste products of coal processing, e.g., coal processing refuse (CPR). Other inorganic materials available on-site (sand, etc.) can be used as anchor particles, either alone or in combination with other inorganic or organic anchor particles. This technology has the advantage of using materials that are readily available on-site during coal processing to treat the fines being produced there.

In embodiments, plastic materials may be used as particles. Both thermoset and thermoplastic resins may be used to form plastic particles. Plastic particles may be shaped as solid bodies, hollow bodies or fibers, or any other suitable shape. Plastic particles can be formed from a variety of polymers. A polymer useful as a plastic particle may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include polyether polyurethanes and polyester polyurethanes. Plastics may also be obtained for these uses from waste plastic, such as post-consumer waste including plastic bags, containers, bottles made of high density polyethylene, polyethylene grocery store bags, and the like. In embodiments, elastomeric materials can be used as particles. Particles of natural or synthetic rubber can be used, for example.

Advantageously, anchor particles can be selected from biomass, so that they complex with the fines to form a biomass-fines composite solid. This process can be advantageous in producing a combustible complex, for example by complexing coal fines with a biomass tether. Biomass can be derived from vegetable sources or animal sources. Biomass can be derived from waste materials, including post-consumer waste, animal or vegetable waste, agricultural waste, sewage, and the like. In embodiments, the biomass sourced materials are to be processed so that they form particles of an appropriate size for tethering and combining with the activated fines. Particle sizes of, e.g., 0.01-50 millimeters are desirable. Processing methods can include grinding, milling, pumping, shearing, and the like. For example, hammer mills, ball mills, and rod mills can be used to reduce oversized materials to an appropriate size. In embodiments, additives might be used in the processing of the anchor particles to improve efficiency, reduce energy requirements, or increase yield. These processing additives include polymers, surfactants, and chemicals that enhance digestion or disintegration. Optionally, other treatment modalities, such as exposure to cryogenic liquids (e.g., liquid nitrogen or solid carbon dioxide) can be employed to facilitate forming anchor particles of appropriate size from biomass. It is understood that biomass-derived anchor particles can be formed as particles of any morphology (regular or irregular, plate-shaped, flakes, cylindrical, spherical, needle-like, etc.) or can be formed as fibers. Fibrous materials may be advantageous in that they facilitate dewatering/filtration of the composite material being formed by these systems and methods, and they can add strength to such composite materials.

Vegetable sources of biomass can include fibrous material, particulate material, amorphous material, or any other material of vegetable origin. Vegetable sources can be predominately cellulosic, e.g., derived from cotton, jute, flax, hemp, sisal, ramie, and the like. Vegetable sources can be derived from seeds or seed cases, such as cotton or kapok, or from nuts or nutshells, including without limitation, peanut shells, walnut shells, coconut shells, and the like. Vegetable sources can include the waste materials from agriculture, such as corn stalks, stalks from grain, hay, straw, or sugar cane (e.g., bagasse). Vegetable sources can include leaves, such as sisal, agave, deciduous leaves from trees, shrubs and the like, leaves or needles from coniferous plants, and leaves from grasses. Vegetable sources can include fibers derived from the skin or bast surrounding the stem of a plant, such as flax, jute, kenaf, hemp, ramie, rattan, soybean husks, corn husks, rice hulls, vines or banana plants. Vegetable sources can include fruits of plants or seeds, such as coconuts, peach pits, olive pits, mango seeds, corncobs or corncob byproducts ("bees wings") and the like. Vegetable sources can include the stalks or stems of a plant, such as wheat, rice, barley, bamboo, and grasses. Vegetable sources can include wood, wood processing products such as sawdust, and wood, and wood byproducts such as lignin.

Animal sources of biomass can include materials from any part of a vertebrate or invertebrate animal, fish, bird, or insect. Such materials typically comprise proteins, e.g., animal fur, animal hair, animal hoofs, and the like. Animal sources can include any part of the animal's body, as might be produced as a waste product from animal husbandry, farming, meat production, fish production or the like, e.g., catgut, sinew, hoofs, cartilaginous products, etc. Animal sources can include the dried saliva or other excretions of insects or their cocoons, e.g., silk obtained from silkworm cocoons or spider's silk. Animal sources can include dairy byproducts such as whey, whey permeate solids, milk solids, and the like. Animal sources can be derived from feathers of birds or scales of fish.

In embodiments, the anchor particle can be substantially larger than the fine particulates it is separating out from the process stream. For example, for the removal of fines with approximate diameters less than 50 microns, anchor particles may be selected for modification having larger dimensions. In other embodiments, the particle can be substantially smaller than the particulate matter it is separating out of the process stream, with a number of such particles interacting in order to complex with the much larger particulate matter. Particles may also be selected for modification that have shapes adapted for easier settling when compared to the target particulate matter: spherical particles, for example, may advantageously be used to remove flake-type particulate matter. In other embodiments, dense particles may be selected for modification, so that they settle rapidly when complexed with the fine particulate matter in the process stream. In yet other embodiments, extremely buoyant particles may be selected for modification, so that they rise to the fluid surface after complexing with the fine particulate matter, allowing the complexes to be removed via a skimming process rather than a settling-out process. In embodiments where the modified particles are used to form a filter, as in a filter cake, the particles selected for modification can be chosen for their low packing density or porosity. Advantageously, particles can be selected that are indigenous to a particular geographical region where the particulate removal process would take place. For example, sand can be used as the particle to be modified for removing particulate matter from the waste stream (tailings) in phosphate mining or other mining activities.

It is envisioned that the complexes formed from the modified particles and the particulate matter can be recovered and used for other applications. For example, when sand is used as the modified particle and it captures fine clay in tailings, the sand/clay combination can be used for road construction in the vicinity of the mining sites, due to the less compactable nature of the complexes compared to other locally available materials.

Anchor particle sizes (as measured as a mean diameter) can have a size up to few hundred microns, preferably greater than about 70 microns. In certain embodiments, macroscopic anchor particles up to and greater than about 1 mm may be suitable. Recycled materials or waste, particularly recycled materials and waste having a mechanical strength and durability suitable to produce a product useful in building roads and the like, or (in other embodiments) capable of combustion, are particularly advantageous.

As an example of a tethering material used with an anchor particle in accordance with these systems and methods, chitosan can be precipitated onto sand particles, for example, via pH-switching behavior. The chitosan can have affinity for anionic systems that have been used to activate fine particles. Anchor particles can be complexed with tethering agents, such agents being selected so that they interact with the polymers used to activate the coal fines. In one example, partially hydrolyzed polyacrylamide polymers can be used to activate particles, resulting in a particle with anionic charge properties. The cationic charge of the chitosan will attract the anionic charge of the activated particles, to attach the sand particles to the activated fine particles.

In embodiments, various interactions such as electrostatic, hydrogen bonding or hydrophobic behavior can be used to affix an activated particle or particle complex to a tethering material complexed with an anchor particle.

In embodiments, the anchor particles can be combined with a polycationic polymer, for example a polyamine. One or more populations of anchor particles may be used, each being activated with a tethering agent selected for its attraction to the activated coal fines and/or to the other anchor particle's tether. The tethering functional group on the surface of the anchor particle can be from modification using a multifunctional coupling agent or a polymer. The multifunctional coupling agent can be an amino silane coupling agent as an example. These molecules can bond to an anchor particle's surface and then present their amine group for interaction with the activated coal fines. In the case of a tethering polymer, the polymer on the surface of the particles can be covalently bound to the surface or interact with the surface of the anchor particle and/or fiber using any number of other forces such as electrostatic, hydrophobic, or hydrogen bonding interactions. In the case that the polymer is covalently bound to the surface, a multifunctional coupling agent can be used such as a silane coupling agent. Suitable coupling agents include isocyano silanes and epoxy silanes as examples. A polyamine can then react with an isocyano silane or epoxy silane for example. Polyamines include polyallyl amine, polyvinyl amine, chitosan, and polyethylenimine.

In embodiments, polyamines (polymers containing primary, secondary, tertiary, and/or quaternary amines) can also self-assemble onto the surface of the particles or fibers to functionalize them without the need of a coupling agent. For example, polyamines can self-assemble onto the surface of the particles through electrostatic interactions. They can also be precipitated onto the surface in the case of chitosan for example. Since chitosan is soluble in acidic aqueous conditions, it can be precipitated onto the surface of particles by suspending the particles in a chitosan solution and then raising the solution pH.

In embodiments, the amines or a majority of amines are charged. Some polyamines, such as quaternary amines are fully charged regardless of the pH. Other amines can be charged or uncharged depending on the environment. The polyamines can be charged after addition onto the particles by treating them with an acid solution to protonate the amines. In embodiments, the acid solution can be non-aqueous to prevent the polyamine from going back into solution in the case where it is not covalently attached to the particle.

The polymers and particles can complex via forming one or more ionic bonds, covalent bonds, hydrogen bonding and combinations thereof, for example. Ionic complexing is preferred.

As an example of a tethering material used with an anchor particle in accordance with these systems and methods, chitosan can be precipitated onto anchor particles, for example, via pH-switching behavior. The chitosan as a tether can have affinity for anionic systems that have been used to activate fine particles. In one example, partially hydrolyzed polyacrylamide polymers can be used to activate coal fines, resulting in a particle with anionic charge properties. The cationic charge of the chitosan will attract the anionic charge of the activated particles, to attach the anchor particles to the activated coal fines. In the foregoing example, electrostatic interactions can govern the assembly of the activated fine particle complexes bearing the anionic partially-hydrolyzed poly-acrylamide polymer and the cationic anchor particles complexed with the chitosan tethering material.

In embodiments, polymers such as linear or branched polyethyleneimine can be used as tethering materials. It would be understood that other anionic or cationic polymers could be used as tethering agents, for example polydiallyldimethylammonium chloride (poly(DADMAC). In other embodiments, cationic tethering agents such as epichlorohydrin dimethylamine (epi/DMA), styrene maleic anhydride imide (SMAI), polyethylene imide (PEI), polyvinylamine, polyallylamine, amine-aldehyde condensates, poly(dimethylaminoethyl acrylate methyl chloride quaternary) polymers and the like can be used. Advantageously, cationic polymers useful as tethering agents can include quaternary ammonium or phosphonium groups. Advantageously, polymers with quaternary ammonium groups such as poly(DADMAC) or epi/DMA can be used as tethering agents. In other embodiments, polyvalent metal salts (e.g., calcium, magnesium, aluminum, iron salts, and the like) can be used as tethering agents. In other embodiments cationic surfactants such as dimethyldialkyl(C8-C22) ammonium halides, alkyl(C8-C22)trimethylammonium halides, alkyl(C8-C22)dimethylbenzylammonium halides, cetyl pyridinium chloride, fatty amines, protonated or quaternized fatty amines, fatty amides and alkyl phosphonium compounds can be used as tethering agents. In embodiments, polymers having hydrophobic modifications can be used as tethering agents.

The efficacy of a tethering material, however, can depend on the activating material. A high affinity between the tethering material and the activating material can lead to a strong and/or rapid interaction there between. A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In one embodiment, a poly(sodium acrylate-co-acrylamide) activator is matched with a chitosan tether material.

In hydrogen bonding terms, a hydrogen bond donor should be used in conjunction with a hydrogen bond acceptor. In embodiments, the tether material can be complementary to the chosen activator, and both materials can possess a strong affinity to their respective deposition surfaces while retaining this surface property.

In other embodiments, cationic-anionic interactions can be arranged between activated coal fines and tether-bearing anchor particles. The activator may be a cationic or an anionic material, as long as it has an affinity for the fine particles to which it attaches. The complementary tethering material can be selected to have affinity for the specific anchor particles being used in the system. In other embodiments, hydrophobic interactions can be employed in the activation-tethering system.

It is envisioned that the complexes formed from the tether-bearing anchor particles and the activated coal fines can be recovered and used for other applications. For example, the complexes can be rapidly separated from water and can be recovered for compaction into coal pellets to be used for combustion. When a combustible anchor particle is selected, the entire coal-anchor complex can be used for energy production. Other anchor particles can be selected to form specialized composites with the activated coal fines, as disclosed below in more detail.

Advantageously, anchor particles can be selected that are indigenous to a particular geographical region where the particulate removal process would take place. For example, sand can be used as the particle to be modified for removing particulate matter from the waste stream (tailings) in phosphate mining or other mining activities.

Suitable anchor particles can be formed from organic or inorganic materials, or any mixture thereof. Anchor particle sizes (as measured as a mass mean diameter) can have a size up to few hundred microns, preferably greater than about 70 microns. In certain embodiments, macroscopic anchor particles up to and greater than about 1 mm may be suitable. Recycled materials or waste, particularly recycled materials and waste having a mechanical strength and durability suitable to produce a product useful in building roads and the like are particularly advantageous.

As an example of a tethering material used with an anchor particle in accordance with these systems and methods, chitosan can be precipitated onto sand particles, for example, via pH-switching behavior. The chitosan can have affinity for anionic systems that have been used to activate fine particles. In one example, partially hydrolyzed polyacrylamide polymers can be used to activate particles, resulting in a particle with anionic charge properties. The cationic charge of the chitosans will attract the anionic charge of the activated particles, to attach the sand particles to the activated fine particles.

In embodiments, various interactions such as electrostatic, hydrogen bonding or hydrophobic behavior can be used to affix an activated particle or particle complex to a tethering material complexed with an anchor particle. In the foregoing example, electrostatic interactions can govern the assembly of the activated fine particle complexes bearing the anionic partially-hydrolyzed polyacrylamide polymer and the cationic sand particles complexed with the chitosan tethering material.

In embodiments, polymers such as linear or branched polyethyleneimine can be used as tethering materials. It would be understood that other anionic or cationic polymers could be used as tethering agents, for example polydiallyldimethylammonium chloride. The efficacy of a tethering material, however, can depend on the activating material. A high affinity between the tethering material and the activating material can lead to a strong and/or rapid interaction there between.

A suitable choice for tether material is one that can remain bound to the anchor surface, but can impart surface properties that are beneficial to a strong complex formation with the activator polymer. For example, a polyanionic activator can be matched with a polycationic tether material or a polycationic activator can be matched with a polyanionic tether material. In hydrogen bonding terms, a hydrogen bond donor should be used in conjunction with a hydrogen bond acceptor. In embodiments, the tether material can be complimentary to the chosen activator, and both materials can possess a strong affinity to their respective deposition surfaces while retaining this surface property.

In other embodiments, cationic-anionic interactions can be arranged between activated fine particles and tether-bearing anchor particles. The activator may be a cationic or an anionic material, as long as it has an affinity for the fine particles to which it attaches. The complementary tethering material can be selected to have affinity for the specific anchor particles being used in the system. In other embodiments, hydrophobic interactions can be employed in the activation-tethering system.

The anchor particle material is preferably added in an amount that permits a flowable slurry. For example, the particle material can be added in an amount greater than 1 gram/liter but less than the amount which results in a non-flowable sludge, amounts between about 1 to about 10 grams/liter, preferably 2 to 6 g/l are often suitable. In some embodiments, it may be desirable to maintain the concentration of the anchor particles to 20 g/l or higher. The anchor particles may be fresh (unused) material, recycled, cleaned ballast, or recycled, uncleaned ballast.

In embodiments, for example when sand is chosen as an anchor particle, higher amounts of the particle material may be added. For example, sand can be added in a range between 1-300 gm/l, preferably between 50-300 gm/l, for example at a dosage level of 240 gm/l.

3. Removal of the Anchor-Tether-Activator Complexes

It is envisioned that the complexes formed from the anchor particles and the activated particulate matter can be recovered and used for other applications. For example, when sand is used as the modified particle and it captures fine clay in tailings, the dewatered sand/clay combination can be used for road construction in the vicinity of the mining sites, due to the less compactable nature of the complexes compared to other locally available materials. As another example, a sand/clay complex could be used to fill in strip mining pits, such as would be found at phosphate mining operations. In other embodiments, complexes with anchor particles and fines could be used in a similar manner on-site to fill in abandoned mines, or the complexes could be used off-site for landfill or construction purposes. The uses of the solid material produced by the systems and methods disclosed herein will vary depending on the specific constituents of the material.

In embodiments, the interactions between the activated fine particles and the tether-bearing anchor particles can enhance the mechanical properties of the complex that they form. For example, an activated fine particle or collection thereof can be durably bound to one or more tether-bearing anchor particles, so that they do not segregate or move from the position that they take on the particles. This property of the complex can make it mechanically more stable.

Increased compatibility of the activated fine materials with a denser (anchor) matrix modified with the appropriate tether polymer can lead to further mechanical stability of the resulting composite material. This becomes quite important when dealing with tailings resulting from mining. This composite material can then be further utilized within the project for road building, dyke construction, or even land reclamation, rather than simply left in a pond to settle at a much slower rate.

A variety of techniques are available for removing the activated-tethered-anchored (ATA) complexes from the fluid stream. For example, the tether-bearing anchor particles can be mixed into a stream carrying activated fine particles, and the complexes can then separated via a settling process such as gravity or centrifugation. In another method, the process stream carrying the activated fine particles could flow through a bed or filter cake of the tether-bearing anchor particles. In any of these methods, the modified particles interact with the fine particulates and pull them out of suspension so that later separation removes both modified particles and fine particulates.

As would be appreciated by artisans of ordinary skill, a variety of separation processes could be used to remove the complexes of modified particles and fine particulates. In the aforesaid removal processes, mechanical interventions for separating the ATA complexes can be introduced, employing various devices as separators (filters, skimmers, centrifuges, and the like). Or other separation techniques can be employed. For example, if the anchor particles had magnetic properties, the complexes formed by the interaction of tether-bearing anchor particles and activated fine particulates could be separated using a magnetic field. As another example, if the tether-bearing anchor particles were prepared so that they were electrically conductive, the complexes formed by the interaction of tether-bearing anchor particles and activated fine particulates could be separated using an electric field. As would be further appreciated by those of ordinary skill, tether-bearing anchor particles could be designed to complex with a specific type of activated particulate matter. The systems and methods disclosed herein could be used for complexing with organic waste particles, for example. Other activation-tethering-anchoring systems may be envisioned for removal of suspended particulate matter in fluid streams, including gaseous streams.

4. Specialized Composites

Composites can be formed with coal fines by selecting anchor particles having particular properties. For example, selecting a combustible anchor particle allows the coal-particle complex to be used for energy production. As another example, selecting an ungelatinized starch particle as an anchor particle allows the formation of a coal-particle complex that can be formed into an energy-bearing pellet that responds to heating by expanding and becoming porous, facilitating rapid and efficient combustion.

In an embodiment, a fine powdered uncooked starch, e.g., ungelatinized, can be selected as anchor particles. A complementary pair of activator and tethering agents can be selected, whereby the starch particles can be coated with the tether agent and the coal fines can be coated with the activator. As an example, a polyelectrolyte pair including a polyanionic polymer and a polycationic polymer can be selected. The polyelectrolyte pair is selected to exhibit strong attraction to each other, even when surrounded with water molecules and other dissolved ions. Polyelectrolytes can be selected that are capable of spontaneous self-assembly on coal fines and starch particles, respectively, to deposit a monolayer or near-monolayer film on the fines and the particles.

In these embodiments, the tethering agent is disposed upon the starch particles to form a tether-bearing anchor. The activator is added to the coal fines. The two fluid streams can then be mixed together, whereby the charge-charge attraction complexes the tether-bearing anchor particles with the activated coal fines, expelling intervening water molecules and precipitating macroscopic coal-starch aggregates.

In embodiments, polyanions including carboxymethyl cellulose (CMC), carboxymethyl starch (CMS), pectin, xanthan gum, alginate, polyacrylic acid, polymethacrylic acid, hydrolyzed polyacrylamide, styrene maleic anhydride copolymer, certain proteins and peptides rich in amino acids containing carboxylic acid side groups, and the like, can be used in the system. In embodiments, polycations including polyethyleneimine, chitosan, polyvinylamine, polyallylamine, polydimethyldiallylammonium chloride (PDAC), epi-dimethylamine (epi-DMA), and certain proteins and peptides rich in amino acids with side amino groups, and the like, can be used in the system. Other polyanion-polycation pairs, including those disclosed above, will be apparent to those of ordinary skill in the art.

In an embodiment, the coal fine slurry can be treated with one type of polyelectrolyte while a starch powder is lightly wetted with another (e.g., sprayed with or a concentrated dispersion of the starch powder is added to a dilute polyelectrolyte solution). The charged starch is then mixed with the coal slurry containing pre-coated coal fines covered with counter-charged polyelectrolyte. Since both solids have an ultrathin polymer layer on their surface, the strong charge-charge attraction immediately brings the disparate particles together, causing firm aggregation and precipitating cohesive pellets. Depending on the intensity of stirring, pellets of different but controlled size readily form. The consolidated aggregates can be easily recovered by passing the combined liquid stream over a coarse wire mesh. Clarified water devoid of either fine powder exits the system, posing little environmental concern. Mechanical pressure or vacuum can be applied to further dewater the solids. Since water is largely excluded from the interior of the pellets, little drying by heat is needed. In arid or semi-arid areas, pellets can dry rapidly at room temperature. Other adjuncts to the pellet formation process, such as adding starches and other pelletizing ingredients, are consistent with these systems and methods, as would be understood by those of ordinary skill in the art. In embodiments, additives to improve dewatering of the solids can be introduced using hydrophobic materials and practices known in the art.

In embodiments, the complexes formed from the ungelatinized-starch-coal-fines composite can be shaped into energy-bearing pellets that possess a unique performance feature: upon modest heating, the starch greatly expands (foams) leaving numerous interior channels for oxygen permeation. This rapid expansion can cause the pellets to disintegrate upon aggressive heating. Not to be bound by theory, it is understood that the thermal decomposition of the oxygen-rich sugar building blocks of starch can create oxygen radicals that can speed up combustion of nearby coal particles (which are typically difficult to burn due to their high aromaticity).

Other difficult-to-burn energy-containing particles can be similarly treated by the foregoing systems and methods so that they can be burned more efficiently. Solutions bearing such energy-containing materials (e.g., coke from coking of heavy crude or bitumen, lignin from pulping, shredded or pulverized recycled plastics/rubbers, fatty acids and waste oils/shortenings that are semi-solid-like) can be treated with activator polymers and complexed with tether-bearing anchor particles, e.g, starch particles as described above. Other tether-bearing anchor particles can be used to complex with the activated energy-containing material, such anchor particles being selected to enhance the combustion process or to effect other desirable chemical reactions. Alternatively, the energy-containing particles can be used as anchor particles, to be combined with other materials that have been activated, the other material being selected to enhance the combustion process or to effect other desirable chemical reactions.

In embodiments, more than two components can be complexed together using the foregoing systems and methods. One can therefore produce complexes of multiple materials designed to have desirable properties, such as more efficient combustion. For example, in an embodiment, lignin and coal dust can each be treated with PDAC while starch is activated with hydrolyzed polyacrylamide. When the dispersions of each component are brought together, a ternary complex can be formed, with lignin/coal commingled and "glued" with starch particles that later expand under heat. The surface monolayer interaction among all the components serves to bind them together and to provide cohesive strength to the pellet composite. In an embodiment, lignin and coke particles can be complexed with starch particles using these systems and methods.

In other embodiments, lignin and coal or coke can be combined as complexes without using coated starch particles. The lignin particles can be used as anchor particles, to be coated with a tethering agent; the coal slurry (dilute or otherwise) can be pretreated with the complementary activator polymer. When the two fluid streams are combined, spontaneous aggregation ensues.

In yet other embodiments, these systems and methods can be used to produce composite pellets containing inorganic solids. For example, alkaline solids (e.g., calcium oxide or magnesium oxide) can be compounded into the composite pellets. During pellet combustion, the aforesaid inorganic materials are converted to the respective carbonate, thus sequestering products of coal combustion such as $CO_2$ and $H_2S$. Thus the pelletized coal-based fuel formed in accordance with these systems and methods are able to capture some of their own undesirable combustion byproducts. Hence, pellets or other coal-based energy sources (e.g., briquettes) can be made to absorb noxious volatile products of combustion, an advantageous property for applications in closed spaces, or example, or in situations where pollution concerns are of particular importance.

5. Exemplary Applications a. Tailings Processing

Extraction of minerals from ores can produce fine, positively charged particles of clay or other materials that remain suspended in the effluent fluid stream. The effluent fluid stream can be directed to a mechanical separator such as a cyclone that can separate the fluid stream into two components, an overflow fluid comprising fine tails that contains the fine (<approximately 50 micron) particles, and an underflow fluid stream that contains coarse tails, mainly sand, with a small amount of fine clay particles.

In embodiments, the systems and methods disclosed herein can treat each fluid stream, an overflow fluid and/or an underflow fluid. An activating agent, such as a polyanion as described above, can preferably be introduced into the overflow fluid stream, resulting in a flocculation of the fine particles therein, often forming a soft, spongy mass. The underflow fluid can be used for the preparation of tether-bearing anchor particles. However, it will be clear that other sources for anchor particles (e.g., sand) can also be used. In certain tailings fluids, the sand within the underflow fluid itself can act as an "anchor particle," as described above. A cationic tethering agent, as described above, can be introduced into the underflow fluid so that it self-assembles onto the surface of the anchor particles, creating a plurality of tether-bearing anchor particles.

Following this treatment to each fluid stream, the two fluid streams can be re-mixed in a batch, semi-batch or continuous fashion. The tether-bearing anchor particles can interact, preferably electrostatically, with the activated, preferably flocculating, fine particles, forming large agglomerations of solid material that can be readily removed from or settled in the resulting fluid mixture.

In embodiments, the aforesaid systems and methods are amenable to incorporation within existing tailings separation systems. For example, a treatment process can be added in-line to each of the separate flows from the overflow and underflow fluids; treated fluids then re-converge to form a single fluid path from which the resulting agglomerations can be removed. Removal of the agglomerations can take place, for example, by filtration, centrifugation, or other type of mechanical separation.

In one embodiment, the fluid path containing the agglomerated solids can be subsequently treated by a conveyor belt system, analogous to those systems used in the papermaking industry. In an exemplary conveyor belt system, the mixture of fluids and agglomerated solids resulting from the electrostatic interactions described above can enter the system via a headbox. A moving belt containing a mechanical separator can move through the headbox, or the contents of the headbox are dispensed onto the moving belt, so that the wet agglomerates are dispersed along the moving belt. One type of mechanical separator can be a filter with a pore size smaller than the average size of the agglomerated particles. The size of the agglomerated particles can vary, depending upon the size of the constituent anchor particles (i.e., sand). For example, for systems where the sand component has a size between 50/70 mesh, an 80 mesh filter can be used. Other adaptations can be envisioned by artisans having ordinary skill in the art. Agglomerated particles can be transported on the moving belt and further dewatered. Water removed from the agglomerated particles and residual water from the headbox from which agglomerates have been removed can be collected in whole or in part within the system and optionally recycled for use in subsequent processing.

In embodiments, the filtration mechanism can be an integral part of the moving belt. In such embodiments, the captured agglomerates can be physically removed from the moving belt so that the filter can be cleaned and regenerated for further activity. In other embodiments, the filtration mechanism can be removable from the moving belt. In such embodiments, the spent filter can be removed from the belt and a new filter can be applied. In such embodiments, the spent filter can optionally serve as a container for the agglomerated particles that have been removed.

Advantageously, as the agglomerated particles are arrayed along the moving belt, they can be dewatered and/or dried. These processes can be performed, for example, using heat, air currents, or vacuums. Agglomerates that have been dewatered and dried can be formed as solid masses, suitable for landfill, construction purposes, or the like.

Desirably, the in-line tailings processing described above is optimized to capitalize upon the robustness and efficiency of the electrostatic interaction between the activated tailings and the tether-bearing anchor particles. Advantageously, the water is quickly removed from the fresh tailings during the in-line tailings processing, permitting its convenient recycling into the processing systems.

b. Remediation of Treatment Ponds

The systems and methods disclosed herein can be used for treatment of tailings at a facility remote from the mining and beneficiation facility or in a pond. Similar principles are involved: the fluid stream bearing the fine tailings can be treated with an anionic activating agent, preferably initiating flocculation. A tether-bearing anchor particle system can then be introduced into the activated tailings stream, or the activated tailings stream can be introduced into a tether-bearing anchor particle system. In embodiments, a tailings stream containing fines can be treated with an activating agent, as described above, and applied to a stationary or moving bed of tether-bearing anchor particles. For example, a stationary bed of tether-bearing anchor particles can be arranged as a flat bed over which the activated tailings stream is poured. The tether-bearing anchor particles can be within a container or housing, so that they can act as a filter to trap the activated tailings passing through it. On a larger scale, the tether-bearing anchor particles can be disposed on a large surface, such as a flat or inclined surface (e.g., a beach), so that the activated tailings can flow over and through it, e.g. directionally toward a pond.

As an example, sand particles retrieved from the underflow fluid stream can be used as the anchor particles to which a cationic tether is attached. A mass of these tether-bearing anchor particles can be arranged to create a surface of a desired thickness, forming an "artificial beach" to which or across which the activated tailings can be applied. As would be appreciated by those of ordinary skill in the art, the application of the activated tailings to the tether-bearing anchor particles can be performed by spraying, pouring, pumping, layering, flowing, or otherwise bringing the fluid bearing the activated tailings into contact with the tether-bearing anchor particles. The activated tailings are then associated with the tether-bearing anchor particles while the remainder of the fluid flows across the surface and into a collection pond or container.

In embodiments, an adaptation of the activator-tether-anchor systems disclosed herein can be applied to the remediation of existing tailings ponds for mining operations. Tailings ponds can comprise different layers of materials, reflecting the gravity-induced settlement of fresh tailings after long residence periods in the pond. For example, the top layer in the tailings pond can comprise clarified water. The next layer is a fluid suspension of fine particles like fine tailings. The fluid becomes denser and denser, often settling into a stable suspension of fluid fine tailings that has undergone self-weight consolidation/dewatering, where the suspended particles have not yet settled out. The bottom layer is formed predominately from material that has settled by gravity. Desirably, the strata of the tailings pond containing suspended particles can be treated to separate the water that they contain from the fine particles suspended therein. The resultant clarified water can be drawn off and the solid material can be reclaimed. This could reduce the overall size of the tailings ponds, or prevent them from growing larger as fresh untreated tailings are added.

In embodiments, the systems and methods disclosed herein can be adapted to treat tailings ponds. In an embodiment, an activating agent, for example, one of the anionic polymers disclosed herein can be added to a pond, or to a particle-bearing layer within a tailings pond, such as by injection with optional stirring or agitation. Tether-bearing anchor particles can then be added to the pond or layer containing the activated fine particles. For example, the tether-bearing anchor particles can be added to the pond from above, so that they descend through the activated layer. As the activated layer is exposed to the tether-bearing anchor particles, the flocculated fines can adhere to the anchor particles and be pulled down to the bottom of the pond by gravity, leaving behind clarified water. The tailings pond can thus be separated into two components, a top layer of clarified water, and a bottom layer of congealed solid material. The top layer of clarified water can then be recycled for use, for example in further ore processing. The bottom layer of solids can be retrieved, dewatered and used for construction purposes, landfill, and the like.

c. Treating Waste or Process Streams

Particles modified in accordance with these systems and methods may be added to fluid streams to complex with the particulate matter suspended therein so that the complex can be removed from the fluid. In embodiments, the modified particles and the particulate matter may interact through electrostatic, hydrophobic, covalent or any other type of interaction whereby the modified particles and the particulate matter form complexes that are able to be separated from the fluid stream. The modified particles can be introduced to the process or waste stream using a variety of techniques so that they complex with the particulate matter to form a removable complex. A variety of techniques are also available for removing the complexes from the fluid stream. For example, the modified particles can be mixed into the stream and then separated via a settling process such as gravity or centrifugation. If buoyant or low-density modified particles are used, they can be mixed with the stream and then separated by skimming them off the surface. In another method, the process stream could flow through a bed or filter cake of the modified particles. In any of these methods, the modified particles interact with the fine particulates and pull them out of suspension so that later separation removes both modified particles and fine particulates.

The particles described herein can be utilized to sequester and suspend fines and pollutants from waste tailings. The technology can be used for the treatment of waste slurry as it is generated or can be used for the remediation of existing tailings ponds. As discussed below, massive amounts of waste tailings are generated in the course of energy production and other mining endeavors. Such wastes or waste fluids can include, but are not limited to, oilfield drilling waste, fine coal tailings and coal combustion residues. Mining endeavors producing wastes and waste fluids include, but are not limited to, processing and beneficiation of ores such as bauxite, phosphate, taconite, kaolin, trona, potash and the like. Mining endeavors having a waste slurry stream of fine particulate matter, can also include without limitation the following mining processes: sand and gravel, nepheline syenite, feldspar, ball clay, kaolin, olivine, dolomite, calcium carbonate containing minerals, bentonite clay, magnetite and other iron ores, barite, and talc.

As examples, the systems and methods disclosed herein can be applied to waste materials such as would be produced by drilling in oil fields, by mining for coal, by burning coal, or by mining other organic materials. Oilfield drilling wastes include rock cuttings, drilling fluids, well stimulation/fracturing fluids, brines, and petroleum residual. In a 1995 survey, 68% of these wastes were disposed onsite by evaporation in retention ponds and burial. The majority of drilling fluids are held in open pits, but the trend is towards a closed system with a storage tank replacing the reserve pit. Fine coal tailings are a waste product of coal preparation plants, where coal is crushed and washed to make a suitable fuel with low sulfur and ash content. The washing process generates a slurry of finely divided particles of clay, coal, and other impurities. This material has accumulated as hundreds of ponds in coal producing areas, often resulting in accidental discharges. Coal combustion products include fly ash, bottom ash, boiler slag, flue gas desulfurization material, and other scrubber wastes. The coal ash flood of December 2008 released 300 million gallons of fly ash sludge and water from a TVA coal fired power plant, damaging 15 homes in Kingston, Tenn. and polluting the Emory River. A number of inorganic mines generate waste materials in fluid streams that can also be separated using the systems and methods disclosed herein.

1) Coal Mining Waste

Coal as it is recovered from the mine (termed "run-of-mine" or ROM coal) comes in a variety of sizes and shapes and contains mineral impurities from which it must be separated. Preparing the ROM coal for other uses, involving processes known as coal preparation or cleaning, aims to sort the coal according to size, and aims to separate it from its mineral content. The mineral content of coal is the noncombustible inorganic fraction, comprised of minerals that are either detrital or authigenic in origin and that are introduced into the coal in the first or second phases of coalification. Minerals can be found in the ROM coal as combinations of larger inclusions within the coal lumps and ultrafine crystals disseminated throughout the coal lumps.

As a first step in coal cleaning, the coal is crushed to reduce its size and to free it up from the larger mineral inclusions. Assisting in this process is the fact that the coal tends to break more easily than the minerals, so that the coal can be liberated from some of the surrounding minerals by size reduction techniques using crushers, rotary breakers or other similar devices. Size differences are exploited to sort the crushed coal into different categories of pellet sizes, some of which can be used immediately if the coal is of sufficient quality. In addition, the larger lumps of coal (~10-150 mm in length) can be treated with a technology called dense-medium separation, where the organic coal is floated free of impurities by immersing the crushed material in a high-density liquid; because the coal is less dense, it floats to the surface, while the heavier mineral matter will sink to be removed as waste.

Further crushing may be necessary if the coal is more intimately associated with minerals. The smaller-sized coal fragments can then be treated with froth flotation to separate the coal from the minerals that surround it. Using this technique, fine coal fragments can be mixed with water and other additives to form a slurry, which is then exposed to streams of air bubbles introduced into the mixture. The coal is carried to the surface in the froth, where it can be skimmed off, screened and dewatered for commercial uses, while the minerals sink to the bottom. The dewatered mass of fine coal obtained through this process is termed FC, for "filter cake." Coal particles in the filter cake are typically about the size of sand particles.

The mineral material separated from the coal during these processes is dewatered, using for example vibratory screens, and then compacted for disposal or for further mineral recovery efforts. This waste mineral material is called coal refuse, or coal processing refuse (CPR). Depending on the type and source of the coal, the ratio of CPR to filter cake can be as high as 5:1 by weight. It may contain particles that range from microns in size to millimeters in size. The CPR may be further treated to remove useful minerals from it, or it may be disposed of as a waste material.

After these water-driven separation processes, fine particles remain in the slurry, called "fines." The fines from coal processing are similar in behavior to the fines produced by coal extraction. Fine materials generated from such mining activities are often found well-dispersed in aqueous environments, such as wastewater. The finely dispersed materials from coal mining, termed "coal fines," are suspended in water during coal extraction and processing. Separating the coal fines from the suspending medium is difficult, as the fines tend to remain suspended unless energy-intensive processes are employed to recover them. In coal mining and processing, significant quantities of coal fines are created that require disposal and handling. About 15-20% of the mined tonnage can be left as residual fines, in sizes ranging from powder to small granules. There is presently no direct utility for these fines, so that they are a source of waste and inefficiency in the industry. Moreover, their handling and storage are hazardous and expensive.

Coal fines can be converted into pellets to facilitate disposal, transportation and handling. Coal-fired power plants can burn coal pellets as the fuel of choice. Pelletizing the coal fines generally requires adding an adhesive binder to the slurry containing coal fines, and using high temperatures or pressures to form the dry, consolidated pellets. Such steps are typically employed to agglomerate coal because coal particles do not naturally adhere to each other unless particle size is carefully controlled and extremely high pressures are used (over 20,000 psi for bituminous coal, for example). As an alternative to high pressure, an adhesive binder such as asphalt can be applied to bind the coal particles together. The adhesive can be expensive itself, and its use requires that a system incorporate equipment specifically to prepare and meter the adhesive, adding additional expense.

Pellet manufacture presently requires both shaping and drying. Water-soluble or water-dispersible binders are difficult to dry, and the resulting pellets are difficult to dewater. Once in pellet form, the coal product is densely consolidated, so that oxygen for combustion penetrates with difficulty. In other words, the high interfacial area characteristic of fines is drastically reduced by pellet formation, and the great combustion efficiency inherent in powder burning is lost.

Currently, then, pelletization permits fines to be disposed of in a form that is useful for combustion purposes and convenient for transport and handling. However, the pellets do not burn efficiently in a combustion chamber. It is known in the art to coat wet pellets with a hydrophobic material during processing so that residual water is trapped in the interior of the pellet; when such pellets are introduced into a boiler, the interior water vaporizes rapidly so that the pellet bursts, releasing powdered coal for combustion. However, the high heat of vaporization for water lowers the overall power output of a plant using such technology. In addition, a coating step is required, adding to the expense of manufacturing.

In addition to coal fines waste, an enormous amount of biomass waste is generated annually. Wood waste is produced by lumber mills, for example, with wasted wood accounting for about ten percent of processed lumber. Wood waste can also be found in forests as deadwood, living biomass, or residua from timber harvesting. Lignocellulosic waste is produced by agriculture (e.g., corn stalks, wheat, hays, grasses, sugar cane bagasse, soybeans) and by processing (e.g., cotton gins). Feathers remaining from poultry farming require disposal as waste. Waste from animal husbandry includes organic material such as manure, feedstock and bedding. Additional organic waste is produced by cattle, hog, chicken, turkey and fish farming. Industrial products such as carpeting and automobile tires end up as waste that must be disposed of.

In embodiments, the systems and methods disclosed herein can use coal from coal processing sources to remove coal fines from a mixture and form a coal-on-coal composite particle. In embodiments, coal from filter cake can be used to attract, consolidate and/or organize coal fines in mixtures, thereby forming a composite particle substantially formed from coal. Such a composite particle, advantageously, can be an efficient source of energy. In embodiments, composite coal-on-coal particles can be formed that are then combined with other adulterants such as sand, minerals or water to decrease the energy content of the final product. Such modification may be carried out, for example, to meet the specifications of a particular customer for an energy source delivering a known quantity of energy. In certain cases, for example, a customer's contract calls for receiving a coal-based energy source that provides 1200 BTU per ton; if the composite coal-on-coal particle pellets provide 1300 BTU per ton, they can be adulterated so that the delivered energy content is lowered.

In embodiments, the systems and methods disclosed herein can use particulate waste material from coal processing to remove coal fines from a mixture and form a composite particle. In embodiments, waste materials such as that found in coal processing refuse (CPR) or other mineral wastes can be used to attract, consolidate and/or organize coal fines in mixtures, forming composite particles with the coal fines that put the waste materials to beneficial uses. In embodiments, these systems and methods have the advantage of using materials (whether energy-yielding like the coal in filter cake (FC) or non-energy-yielding like the minerals in CPR or other waste materials) that are found abundantly on site where coal is mined and processed.

In accordance with these systems and methods, FC and CPR can be used as anchoring particles for treating coal fines dispersed in slurries in a process that is rapid and robust, yielding clarified water and geotechnically stable solids that are easy to handle and stackable. These systems and methods can result in near-immediate recovery of coal fines from aqueous suspensions, producing solids that have very low initial (i.e., pre-drying) moisture levels. Sequestration of coal fines as composite particles with CPR can allow stockpiling and disposal of this waste material. Sequestration of coal fines as composite particles with FC can produce combustible pellets that can convert energy sources now discarded into useable fuel.

In embodiments, the systems and methods disclosed herein can use the activator-tether-anchor particle (ATA) technology for pelletizing coal to yield pellets that are dense during handling and transport, but that combust efficiently and completely. In preparing pellets from coal fines, dewatering takes place spontaneously, rapidly and substantially completely; in embodiments, heat and/or pressure is not required. The dewatering process exploits strong molecular forces between charged species.

In embodiments, the pellets can become porous upon exposure to heat, achieving the high combustion efficiency found in powdery fuel. In such embodiments, the porosity can be imparted due to heat-induced foaming of components within the pellet matrix. The disclosed systems and methods can produce a pellet comprising components that expand upon heating, creating interior pores and channels that allow oxygen penetration. Such a highly perforated and expanded structure can optimize combustion. The self-expanding feature of the pellets contributes to combustion efficiency by virtue of its behavior as a de facto oxygenator. In embodiments, oxygen for combustion with the pellets can be taken up by coal particle surfaces by diffusion through the heat-induced porosity of the pellet matrix, and by fragmentation of the matrix structure.

Pellets in accordance with these systems and methods are suitable for use in, for example, power generation facilities. The enhanced efficiency of the instant pellets can yield greater power generation, and less unwanted byproducts (e.g., various noxious effluent gases and/or colloidal solids).

In accordance with these systems and methods, pellets can be produced that are composites of coal and biomass. In embodiments, composite pellets can be formed having a self-expanding feature that creates porosity, so that the pellets can undergo efficient combustion. Finally the process consolidates coal slurry without the need of intricate mechanical assist and the expelled water is clarified. Fines originally dispersed in the slurry are nearly completely captured and incorporated into the pellets.

In embodiments, the systems and methods disclosed herein can enhance the settlement rate of dispersed coal fines materials by incorporating them within a coarser particulate matrix, so that coal solids can be removed from aqueous suspension as a material suitable for pelletizing. The systems and methods disclosed herein involve three components: preparing tether-bearing anchor particles, activating the coal fines, and complexing the activated coal fines with the tether-bearing anchor particles to form a removable complex.

In embodiments, the systems and methods disclosed herein can remove coal fines from a fluid, where the fluid contains a population of suspended coal fines. The system comprises an activator polymer added to the fluid to complex with the suspended coal fines to form activated coal fines, the activated coal fines residing within the fluid volume, and further comprises an anchor particle complexed with a tethering agent to form tether-bearing anchor particles. In this system, the tether-bearing anchor particles are mixed with the fluid volume to contact the activated coal fines, the tether-bearing anchor particles being capable of complexing with the activated coal fines to form complexes removable from the fluid. In accordance with this system, the complexes removable from the fluid comprise a composite material that includes complexed coal fines and anchor particles. In embodiments, the anchor particle comprises biomass. In embodiments, the anchor particle comprises starch. In embodiments, the anchor particle comprises a combustible material. In embodiments, the methods for removing coal fines from a fluid comprise providing an activator polymer capable of interacting with a population of coal fines suspended in a fluid; adding the activator polymer to the population to form activated coal fines; providing an anchor particle; complexing the anchor particle with a tethering agent capable of complexing with the activated coal fines, thereby forming tether-bearing anchor particles; mixing the tether-bearing anchor particles with the activated coal fines to form a complex removable from the fluid, the complex comprising a composite material comprising coal fines and anchor particles, and removing the composite material from the fluid. In embodiments, the anchor particle comprises biomass or starch or combustible materials.

In accordance with these systems and methods, energy-bearing pellets can be produced that are composite materials comprising an energy-containing fine material and a combustible anchor particle in a complex. The complex can include an interacting pair of polyelectrolytes, wherein the first of the pair of polyelectrolytes is bound to the energy-containing fine material and the second of the pair of polyelectrolytes is bound to the combustible anchor particle. In embodiments, the energy-containing fine material comprises coal fines. In embodiments, the anchor particle comprises biomass or starch.

2) Coal Combustion Products

One of the significant wastes produced during coal combustion is fly ash. The ash content of coal can range from 5 wt % for high-grade coal up to 50 wt % for poor quality coal. Over 131 million tons of fly ash is generated annually in the US alone. Current regulations mandate that fly ash be captured from exhaust gas streams, typically by electrostatic precipitators.

Fly ash is primarily composed of silicon dioxide, aluminum oxide, iron oxides, and calcium oxide, though its composition varies depending on the input coal and combustion conditions. Fly ash particles are usually spherical with diameters in the range of 0.1-100 µm. Depending on the composition of the fly ash, it may possess pozzolanic or even self-cementing properties. These properties allow fly ash to be reused in concrete, embankments, and a variety of building and construction materials.

Up to 47% of fly ash generated in the US ends up being beneficially reused. The remaining 53% of fly ash generated in the US is disposed of in landfills (in dry powder-like form) or in massive man-made impoundment areas (in slurry form). Problems with landfill disposal include seepage into the environment and the ability of the fly ash to become airborne in the form of hazardous dusts. Trace amounts of toxic elements are frequently present in fly ash, including but not limited to the following: arsenic, barium, chromium, lead, manganese, selenium, strontium, and zinc. Slurry impoundment avoids dust issues; however groundwater contamination can occur and, more significantly, massive and immediate environmental damage can occur if an impoundment dam ruptures. A prime example occurred in 2008 when a Tennessee Valley Authority fly ash impoundment dam ruptured and released approximately 1.1 billion gallons of fly ash slurry into the environment.

In embodiments, the systems and methods disclosed herein can be used to consolidate the fine coal combustion products like fly ash. A fluid stream containing the fly ash or similar fine particles can be treated with an activator, and a tether-bearing anchor particle can be added to the activated fluid stream. The activator binds to the fine particles, and the tethers on the anchor particles binds to the activator-fine particle units. A complex is formed between the activator-fine particle units and the tether-bearing anchor particles. Such complexes can be readily removed from the fluid stream. Few alternative disposal techniques exist for fly ash.

3) Inorganic Mining Waste

A number of mining operations yield wastewater streams containing fine particles produced during the processing or beneficiation of ores. As an example, the production of aluminum from bauxite ore according to the commonly-used Bayer process takes place by treating the crushed or ground ore with a hot sodium hydroxide solution to produce alumina ($Al_2O_3$), which can be reduced to yield aluminum. The insoluble part of the bauxite ore is carried away as an alkaline aqueous slurry called "red mud." Red mud is a complex material with characteristics that depend on the bauxite from which it is derived, and on the process parameters that produce it. Common characteristics of red mud include a water suspension of fine particles suspended in a highly alkaline water solution, mainly composed of iron oxides, but having a variety of elements and mineralogical phases. The red mud fluid stream, containing about 7-9% solids, is typically sequestered in a containment area (an old excavated mine or a manmade lake called a tailings pond) so that the solids can settle out by gravity. About two tons of red mud is produced per ton of metallic aluminum. The magnitude of red mud associated with aluminum production poses a significant environmental challenge for countries where bauxite is refined. A small country like Jamaica, for example, where bauxite refinement is a leading industry, lacks open land suitable for disposal of the hazardous red mud; moreover, containment problems such as leakage, groundwater seepage and rupture of tailings pond dikes makes disposal of this material even more hazardous.

As another example, iron is produced from an ore called taconite that contains magnetite, an amalgam of iron oxides with about 25-30% iron. To extract the iron from the ore, the ore is crushed into fine particles so that the iron can be removed from the non-ferromagnetic material in the ore by a magnetic separator. The iron recovered by the magnetic separator is then processed into "pellets" containing about 65% iron that can be used for industrial purposes like steel-making Ore material not picked up by the magnetic separator is considered waste material, or gangue, and is discarded. Gangue typically includes non-ferrous rocks, low-grade ore, waste material, sand, rock and other impurities that surround the iron in the ore. For every ton of pellets produced, about 2.7 tons of gangue is also produced. The waste is removed from the beneficiation site as a slurry of suspended fine particles, termed tailings. About ⅔ of the tailings are classified as "fine tailings," composed of extremely fine rock particles more than 90% of which are smaller than 75 microns, or −200 mesh); typically, the fine tailings they have little practical use at the mines, and end up sequestered in containment areas such as tailings ponds.

Another mining operation with similar wastewater handling issues is the production of kaolin. Kaolin ("china clay") is a white claylike material composed mainly of a hydrated aluminum silicate admixed with other clay minerals. Kaolin, used for a variety of industrial applications, is mined and then processed; dry processes and wet processes are available. Wet processes, used extensively to produce additives for the paper industry, yield a slurry that is fractionated into coarse and fine fractions using a variety of mechanical means like centrifuges, hydrocyclones and hydroseparators. Despite repeated processing, a fraction of the slurry contains fine particulate kaolin that cannot be separated from other fine particulate waste residues. This material is deemed waste, and is sequestered in containment areas, either manmade lagoons or spent kaolin mines.

Trona (trisodium hydrogendicarbonate dihydrate) is a mineral that is mined in the United States as a source of sodium carbonate. After the trona is mined, it is processed by exposing it to aqueous solvents so that the sodium carbonate can be recovered. The insoluble materials in the trona, including oil shales, mudstone and claystone, is carried away as tailings for disposal. Tailings, containing suspended fine particles in a fluid stream, may be transported to confinement areas, like tailings ponds; alternatively, tailings may be pumped into abandoned areas of the mine, with retaining walls or other barriers being constructed as needed to prevent the tailings from entering mine areas that are still active.

Phosphatic ore (fluorapatite) mining is a major worldwide industry, with over 150 million tons of ore mined annually. Domestic mining produces around 30 million tons of ore, about 75% of which comes from Florida. During the extraction of phosphate from the mined ore, a process called beneficiation, significant quantities of waste clay and sand are generated. The approximate ratio of the extracted ore is 1:1:1 of fluorapatite to clay to sand. Thus, with the 30 million tons of ore being mined, around 10 million tons of waste clay and 10 million tons of waste sand must be disposed of annually in the U.S.

The clay that is produced by beneficiation exists in a 3-5% (by weight) slurry. The current practice of clay disposal is to store the clay slurry in large ponds known as clay settling areas (CSAs), where the clay is allowed to separate from the water suspension by gravity over long periods of time, i.e., several decades. For a typical phosphate mine, up to 60% of the surface area of the mine ends up as CSAs. Estimates are that around 5,000 acres of land is turned into CSAs annually in central Florida. Left untreated it can take several decades before CSAs become stable enough for reuse to be considered. Because of the huge environmental and economic impacts of CSAs, a simple, robust, and cost-effective method for treating the clay slurry waste is needed.

While other methods for separating clay fines from wastewater slurries have been tried for phosphate mining, they have proven to be difficult and costly. For example, the Dewatering Instantaneously with Pulp Recycle (DIPR) process has been under investigation for over 20 years at the Florida Institute of Phosphate Research (FIPR), disclosed in U.S. Pat. No. 5,449,464. According to this disclosure, clay slurry is treated with a flocculant and a pulp material to dewater the slurry. While this approach has been studied for over two decades, its high cost, partly due to capital costs of equipment to dewater the treated slurry to high solids content, has prevented its adoption. There remains a need in the art, therefore, for an effective and economical approach to treating the clay-bearing wastewater slurry that is produced during phosphate beneficiation.

Research in treating wastewater produced by extracting bitumen from oil sands ore has demonstrated that tailings from these operations can be treated in a three-step process to consolidate suspended clay fines into solid masses that can be readily removed from the fluid stream. These systems and methods are disclosed in International Application No.: PCT/US09/54278, the entire teachings of which are hereby incorporated by reference herein. Modifications of such systems and methods can be advantageously applied to the treatment of fluid wastewater streams that beneficiation processes for mined ores produce.

In embodiments, the systems and methods disclosed herein can be applied to the treatment of wastewater streams containing fine particles produced during the processing or beneficiation of ores. The systems and methods disclosed herein can be combined with routine modifications of the fluid stream in anticipation of treatment, in the course of treatment, or following treatment. For example, pH adjustments of the fluid stream can be carried out. In embodiments, the systems and methods disclosed herein can be adapted to and optimized for the needs of a specific mining industry for treatment of particulate suspensions in fluid streams of waste products.

For example, following the production of aluminum, e.g., from bauxite ore according to the commonly-used Bayer process, the insoluble part of the bauxite ore is carried away as an alkaline aqueous slurry called "red mud." Red mud typically comprises a water suspension of fine particles suspended in a highly alkaline water solution, mainly composed of iron oxides, but having a variety of elements and mineralogical phases. The fluid stream can be treated with an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to waste produced during the beneficiation of iron, for example, iron produced from taconite. As iron is produced from the ore, waste material called gangue is generated. The gangue is removed from the beneficiation site as a slurry of suspended fine particles, termed tailings. About ⅔ of the tailings are classified as "fine tailings," a waste material suitable for treatment by the systems and methods disclosed herein. In embodiments, the fluid stream containing the fine tailings can be treated with an activator in accordance with these systems and methods, and can be contacted with tether-bearing anchor particles. As a result of this treatment, the fines in the fluid stream can be sequestered as solids and separated from the fluid itself In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to waste produced during the beneficiation of kaolin. The processing of kaolin yields a slurry that can be separated into a fraction that contains fine particulate kaolin that cannot be readily removed from the fluid stream. This fluid stream is suitable for treatment by the systems and methods disclosed herein. In embodiments, the fluid stream containing the fine tailings can be treated with an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to the waste produced during the mining of trona. Following the mining and beneficiation of trona, insoluble materials carried away as waste can include fine particulate tailings transported in a fluid stream. This fluid stream is suitable for treatment by the systems and methods disclosed herein. In embodiments, the fluid stream containing the fine tailings can be treated with an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

As another example, the systems and methods disclosed herein can be applied to the waste produced during the mining of phosphate. During the beneficiation of phosphate ore, waste materials including fine clay particles (clay fines) are produced and are carried away in a fluid waste stream or slurry. This fluid stream is suitable for treatment by the systems and methods disclosed herein. In embodiments, the fluid stream containing the fine tailings can be treated with an activator in accordance with these systems and methods, and can be contacted with tether-bearing anchor particles. As a result of this treatment, the fines in the fluid stream can be sequestered as solids and separated from the fluid itself. In embodiments, the sequestered solids can be consolidated into a mass that can be used for a variety of beneficial applications. In embodiments, anchor particles can be used that are indigenous to the mining area, or that are economically introduced into the mining area for use with these processes.

In embodiments, for example, the systems and methods disclosed herein provide methods for treating and disposing of phosphatic clays, in conjunction with the sand waste also generated during phosphatic ore beneficiation. In other embodiments, the systems and methods disclosed herein provide methods for treating and disposing of fines collected from tailings streams. Advantageously, coarse waste from mining operations can be used as anchor particles, or waste-like materials (sand, crushed rock, or other waste materials) can be brought on-site to be used for anchor particles.

As another example, potash mining operations result in wastewater handling issues that can be advantageously addressed with the systems and methods disclosed herein. Potash is the general name for potassium salts, including potassium carbonate, and is mined for agricultural (fertilizer) use. A large portion of the mined potash ore ends up as a waste, either as a solid or slurry, called potash tailings. The potash tailings slurry is an aqueous saturated salt/brine stream that contains waste ore, clays, and other fine materials. The most common method for disposal is to pump the potash tailings into above-ground impoundment areas or mined underground pits. The large volumes of tailings and high salinity pose significant disposal issues. Additionally, large amounts of salt simply end up in these waste streams. Environmental concerns are adding increased pressure for potash mining companies to find alternatives to tailings ponds as a disposal practice.

A number of other mining operations produce fine particulate waste carried in fluid streams. Such fluid streams are suitable for treatment by the systems and methods disclosed herein. Modification of the fluid stream before, during or after application of these systems and methods may be advantageous. For example, pH of the fluid stream can be adjusted. Examples of additional mineral mining operations that have a waste slurry stream of fine particulate matter can include the following mining processes: sand and gravel, nepheline syenite, feldspar, ball clay, kaolin, olivine, dolomite, calcium carbonate containing minerals, bentonite clay, magnetite and other iron ores, barite, and talc.

EXAMPLES

Examples 1-7

The following materials were used in the Examples 1-7 below:
Washed Sea Sand, 50+70 Mesh, Sigma Aldrich, St. Louis, Mo.
Chitosan CG 800, Primex, Siglufjodur, Iceland
Branched Polyethyleneimine (BPEI) (50% w/v), Sigma Aldrich, St. Louis, Mo.
Polyvinyl Amine-Lupamin 1595, Lupamin 9095, BASF, Ludwigshafen, Germany
Poly(diallyldimethylammonium chloride) (pDAC) (20% w/v), Sigma Aldrich, St. Louis, Mo.
FD&C Blue #1, Sigma Aldrich, St. Louis, Mo.
Hydrochloric Acid, Sigma Aldrich, St. Louis, Mo.
Tailings Solution from a low-grade tar sand Dicalite, Diatomaceous Earth, Grefco Minerals, Inc., Burney, Calif.

3-Isocyanatopropyltriethoxysilane, Gelest, Morrisville, Pa.

Sodium Hydroxide, Sigma Aldrich, St. Louis, Mo.

Isopropyl Alcohol (IPA), Sigma Aldrich, St. Louis, Mo.

Example 1

BPEI Coated Diatomaceous Earth

Diatomaceous earth (DE) particles coupled with BPEI are created using a silane coupling agent. 100 g of DE along with 1000 mL isopropyl alcohol (IPA) and a magnetic stir bar is placed into an Erlenmeyer flask. 1 gm 3-Isocyanatopropyltriethoxysilane is added to this solution and allowed to react for 2 hours. After 2 hours, 2 mL of BPEI is added and stirred for an additional 5 hours before filtering and washing the particles with IPA 2x's and deionized water (DI water). The particles are then filtered and washed with a 0.12 M HCl solution in isopropanol (IPA) then dried.

Example 2

1% Chitosan CG800 Stock Solution

The chitosan stock solution is created by dispersing 10 g of chitosan (flakes) in 1000 mL of deionized water. To this solution is added hydrochloric acid until a final pH of 5 is achieved by slowly and incrementally adding 12 M HCl while continuously monitoring the pH. This solution becomes a stock solution for chitosan deposition.

Example 3

Diatomaceous Earth—1% Chitosan Coating 10 g of diatomaceous earth is added to 100 mL deionized water with a stir bar to create a 10% slurry. To this slurry is added 10 mL's of the 1% chitosan stock solution of CG800. The slurry is allowed to stir for 1 hour. Once the slurry becomes homogeneous the polymer is precipitated out of solution by the slow addition of 0.1 N sodium hydroxide until the pH stabilizes above 7 and the chitosan precipitates onto the particles of diatomaceous earth. The slurry is filtered and washed with a 0.05 M HCl solution in isopropanol (IPA) then dried.

Example 4

Particle Performance on Tailings Solution

Coated and uncoated diatomaceous earth particles were used in experiments to test their ability to settle dispersed clay fines in an aqueous solution. The following procedure was used for each type of particle, and a control experiment was also performed where the particle addition step was omitted.

One gram of particles was added to a centrifugation tube. Using a syringe, the centrifugation tube was then filled with 45 ml of tailing solution containing dispersed clay. One more tube was filled with just the tailings solution and no diatomaceous earth particles. The tube was manually shaken for 30 seconds and than placed on a flat countertop. The tube was then observed for ten minutes allowing the clay fines to settle out.

Results:

No DE addition (control samples): Tailing solution showed no significant improvement in cloudiness.

DE Coated with Chitosan: Tailing solution was significantly less cloudy compared to control samples.

DE Coated with BPEI: Tailing solution was significantly less cloudy compared to control samples.

DE Uncoated: Tailing solution showed no significant improvement in cloudiness compared to control samples.

Example 5

Preparation of Polycation-Coated Washed Sea Sand

Washed sea sand is coated with each of the following polycations: chitosan, lupamin, BPEI, and PDAC. To perform the coating, an aqueous solution was made of the candidate polycation at 0.01M concentration, based on its molecular weight. 50 g washed sea sand was then placed in a 250 ml jar, to which was added 100 ml of the candidate polycation solution. The jar was then sealed and rolled for three hours. After this, the sand was isolated from the solution via vacuum filtration, and the sand was washed to remove excess polymer. The coated sea sand was then measured for cation content by solution depletion of an anionic dye (FD&C Blue #1) which confirmed deposition and cationic nature of the polymeric coating. The sea sand coated with the candidate polymer was then used as a tether-attached anchor particle in interaction with fine particulate matter that was activated by treating it with an activating agent.

Example 6

Use of Polymer-Coated Sea Sand to Remove Fine Particles from Solution

In this Example, a 45 ml. dispersion of fine materials (7% solids) from an oil sands tailings stream is treated with an activating polymer (Magnafloc LT30, 70 ppm). The fines were mixed thoroughly with the activating polymer. 10 gm of sea sand that had been coated with PDAC according to the methods of Example 1 were added to the solution containing the activated fines. This mixture is agitated and is immediately poured through a stainless steel filter, size 70 mesh. After a brief period of dewatering, a mechanically stable solid is retrieved. The filtrate is also analyzed for total solids, and is found to have a total solids content of less than 1%.

Example 7

Use of Sea Sand Without Polymer Coating to Remove Fine Particles from Solution (Control)

In this Example, a 45 ml. dispersion of fine materials (7% solids) is treated with an activating polymer (Magnafloc LT30, 70 ppm). The fines were mixed thoroughly with the activating polymer. 10 gm of uncoated sea sand were added to the solution containing the activated fines. This mixture is agitated and is immediately poured through a stainless steel filter, size 70 mesh. The filtrate is analyzed for total solids, and is found to have a total solids content of 2.6%.

Examples 8-18

The following materials were used in Examples 8-18 below:
  Commercially available poly(acrylamide) (50% hydrolyzed), 15M MW
  Poly(diallyldimethylammonium chloride) (pDADMAC) (20% w/v), Sigma Aldrich, St. Louis, Mo.
  Coal slurry from a coal washing plant
  Bagasse from the Louisiana sugar industry
  Peanut shells from Whole Foods Grocery Store
  Coal solids, 0.01-0.2 cm size fraction
  Lignin powder, Sigma Aldrich, St. Louis, Mo.
  Paper pulp from a bleached kraft mill
  Corn starch Shaw's Grocery Store brand
  Grass clippings from Cambridge, Mass.
  Coal mine samples of filter cake and coal processing refuse

Example 8

Activated Coal Slurry

Coal slurry was thoroughly mixed to ensure that a uniformly dispersed, homogeneous suspension is present. The coal slurry that was used contains 22% dry solids. To the slurry, an activator, 50% hydrolyzed poly(acrylamide), was added to yield a 113 ppm (activator to coal solids) concentration. The coal slurry with activator is gently mixed until visible flocculations ("flocs") are formed.

Example 9

Activated Coal Slurry+Tethered Bagasse

Commercial bagasse was dried and mechanically chopped or blended to produce solids of 1 cm in length or smaller. The dried, chopped bagasse was mixed with water and tethered with 500 ppm of pDADMAC. Activated coal slurry prepared in accordance with Example 8 was combined with the tethered bagasse in a ratio of 0.06:1 (bagasse to coal slurry dry solids). The tethered bagasse plus activated coal slurry solution was mixed for ~10 seconds and poured into a 250 mL graduated cylinder and allowed to settle for 15 minutes. The settling rate corresponded to approximately 8 ft/hr. The bed height compacted to approximately 63% of the initial volume of the mixture, and the turbidity of the supernatant was 221 Nephelometric Turbidity Units (NTU). A sample of the bagasse-coal solids was dabbed dry with paper towels, and the remaining wet solids contained approximately 54% dry solids. The solids can be air dried or dried by some other means to produce readily usable fuel.

Example 10

Activated Coal Slurry+Tethered Peanut Shells

Commercial peanut shells were mechanically chopped or blended to produce solids of 2 cm in size or smaller. The chopped peanut shells were mixed with water and tethered with 500 ppm of pDADMAC. Activated coal slurry prepared in accordance with Example 8 was combined with the tethered peanut shells in a ratio of 0.06:1 (peanut shells to coal slurry dry solids). The tethered peanut shells plus activated coal slurry solution was mixed for ~10 seconds and poured into a 250 mL graduated cylinder and allowed to settle for 15 minutes. The settling rate corresponded to approximately 4 ft/hr. The bed height compacted to approximately 60% of the initial volume of the mixture, and the turbidity of the supernatant was 27 NTU. A sample of the peanut shells-coal solids was dabbed dry with paper towels, and the remaining wet solids contained approximately 51% dry solids. The solids can be air dried or dried by some other means to produce readily usable fuel.

Example 11

Activated Coal Slurry+Tethered Coal

Coal chunks were mechanically crushed to produce solids of 0.2 cm in length or smaller. The crushed coal was mixed with water and tethered with 500 ppm of pDADMAC. Activated coal slurry prepared in accordance with Example 8 was combined with the tethered crushed coal in a ratio of 0.51:1 (crushed coal to coal slurry dry solids). The tethered crushed coal plus activated coal slurry solution was mixed for ~10 seconds and poured into a 250 mL graduated cylinder and allowed to settle for 15 minutes. The settling rate corresponded to approximately 11 ft/hr. The bed height compacted to approximately 56% of the initial volume of the mixture, and the turbidity of the supernatant was 473 NTU. A sample of the coal-coal solids was dabbed dry with paper towels, and the remaining wet solids contained approximately 61% dry solids. The solids can be air dried or dried by some other means to produce readily usable fuel.

Example 12

Activated Coal Slurry+Tethered Lignin

Lignin powder was mixed with water and tethered with 500 ppm of pDADMAC. Activated coal slurry prepared in accordance with Example 8 was combined with the tethered lignin in a ratio of 0.51:1 (lignin to coal slurry dry solids). The tethered lignin plus activated coal slurry solution was mixed for ~10 seconds and poured into a 250 mL graduated cylinder and allowed to settle for 15 minutes. The settling rate corresponded to approximately 6 ft/hr. The bed height compacted to approximately 65% of the initial volume of the mixture. A sample of the lignin-coal solids was dabbed dry with paper towels, and the remaining wet solids contained approximately 57% dry solids. The solids can be air dried or dried by some other means to produce readily usable fuel.

Example 13

Activated Coal Slurry+Tethered Pulp

Commercial paper pulp was mixed with water overnight and tethered with 500 ppm of pDADMAC. Activated coal slurry prepared in accordance with Example 8 was combined with the tethered paper pulp in a ratio of 0.58:1 (wet pulp to coal slurry dry solids). The tethered pulp plus activated coal slurry solution was mixed for ~10 seconds and poured into a 250 mL graduated cylinder and allowed to settle for 15 minutes. The settling rate corresponded to approximately 5 ft/hr. The bed height compacted to approximately 71% of the initial volume of the mixture, and the turbidity of the supernatant was 109 NTU. A sample of the pulp-coal solids was dabbed dry with paper towels, and the remaining wet solids contained approximately 51% dry solids. The solids can be air dried or dried by some other means to produce readily usable fuel.

Example 14

Activated Coal Slurry+Tethered Starch

Commercial corn starch was mixed with water and tethered with 500 ppm of pDADMAC. Activated coal slurry prepared in accordance with Example 8 was combined with the tethered starch in a ratio of 0.53:1 (starch to coal slurry dry solids). The tethered starch plus activated coal slurry solution was mixed for ~10 seconds and poured into a 250 mL graduated cylinder and allowed to settle for 15 minutes. The settling rate corresponded to approximately 2 ft/hr. The bed height compacted to approximately 69% of the initial volume of the mixture, and the turbidity of the supernatant was 803 NTU. A sample of the starch-coal solids was dabbed dry with paper towels, and the remaining wet solids contained approximately 56% dry solids. The solids can be air dried or dried by some other means to produce readily usable fuel.

Example 15

Activated Coal Slurry+Tethered Grass Clippings

Grass clippings were dried and mechanically chopped or blended to produce solids of 1 cm in length or smaller. The dried, chopped grass clippings were mixed with water and tethered with 500 ppm of pDADMAC. Activated coal slurry prepared in accordance with Example 8 was combined with the tethered grass clippings in a ratio of 0.06:1 (grass clippings to coal slurry dry solids). The tethered grass clippings plus activated coal slurry solution was mixed for ~10 seconds and poured into a 250 mL graduated cylinder and allowed to settle for 15 minutes. The settling rate corresponded to approximately 7 ft/hr. The bed height compacted to approximately 64% of the initial volume of the mixture, and the turbidity of the supernatant was 387 NTU. A sample of the grass clippings-coal solids was dabbed dry with paper towels, and the remaining wet solids contained approximately 52% dry solids. The solids can be air dried or dried by some other means to produce readily usable fuel.

Example 16

Activated Coal Slurry+Tethered Peanut Shells, Filtration

A solution containing tethered peanut shells plus activated coal slurry solution, all prepared in accordance with Example 11, was mixed for ~10 seconds and poured into a filtration unit with a 80 mesh stainless steel screen. When mild vacuum was applied to the mixture, the filtration process took 40 seconds. The turbidity of the filtrate was 75 NTU. A sample of the retentate (peanut shells-coal solids) contained approximately 48% dry solids. The solids can be air dried or dried by some other means to produce readily usable fuel.

Example 17

Activated Coal Slurry+Tethered Pulp, Filtration

A solution of tethered pulp plus activated coal slurry solution, all prepared in accordance with Example 13, was mixed for ~10 seconds and poured into a filtration unit with a 80 mesh stainless steel screen. When mild vacuum was applied to the mixture, the filtration process took 37 seconds. The turbidity of the filtrate was 122 NTU. A sample of the retentate (pulp-coal solids) contained approximately 48% dry solids. The solids can be air dried or dried by some other means to produce readily usable fuel.

Example 18

Activated Coal Slurry+Tethered Filter Cake Coal (FC) or Coal Processing Refuse (CPR)

For each experiment in this Example, a sample of FC or CPR was used as anchors. For each sample, a dilute solution of the tethering polymer (p-DADMAC) was added at 500 ppm based on solids, and mixed. Activated coal slurry was prepared in accordance with Example 8. The tethered FC or CPR was added to the activated coal slurry and was gently mixed. The mixture was then gravity filtered through a filtration unit having a 80 mesh stainless steel screen. The time of filtration for each sample was measured starting from the time that the activated coal/tethered CPR or FC mixture was poured on the filter mesh. The solids residing on the mesh were analyzed while resident on the screen, using a moisture analyzer. An aliquot of the resident solids was blotted dry with paper towels to remove externally adherent water drops and was then analyzed to determine the dry solids content. The results of these experiments are set forth in Table 1 below.

TABLE 1

| Sample | Anchor:Fines (g:g) | Filtration Time (s) | Filtrate Turbidity (NTU) | Dry Solids (%) | Dry Solids Dabbed (%) |
|---|---|---|---|---|---|
| FC-1 | 0.5:1 | 67 | 23 | 59 | 66 |
| CPR-1 | 0.5:1 | 152 | 274 | 60 | 65 |
| CPR-2 | 1:1 | 66 | 20 | 66 | 79 |

For each sample, the solids resident on the filter mesh were compact and self-adherent. For certain samples, the solids could be easily scraped or removed from the filter in one or two pieces. The filtrate for all samples had low turbidity values, with samples FC-1 and CPR-2 having extremely low turbidity values of 23 NTU and 20 NTU, respectively.

After performing the measurements above, the integrity and cohesiveness of the solid material on the filter mesh was tested by pouring a large amount of water onto the solids resident on the mesh. Vacuum was applied and water was refiltered through the solids. Filtration time and turbidity of filtrate were measured, and the solid samples were examined. For each sample, the resident solids appeared stable and cohesive. The CPR-2 sample's second filtration time was under three minutes and the filtrate had an even lower turbidity of 8.5 NTU, while the FC-1 sample took 17 minutes to filter and the filtrate had a slightly higher turbidity value of 34 NTU. These experiments suggest that the consolidated solids prepared in accordance with this protocol retain their integrity even after exposure to water washing, as might occur, for example, with heavy rains, and there is no evidence of significant redispersion of the particles in the water.

For each sample, the remaining solids were oven-dried and examined thereafter for consistency and cohesiveness. For each sample, a solid and apparently geotechnically stable dried mass resulted from oven-drying.

Examples 19-27

The following materials were used in Examples 19-27 below:
Poly(diallyldimethylammonium chloride) (PDAC), 20% in Water, Sigma-Aldrich, St. Louis, Mo.
Magnafloc LT30, Ciba/BASF, Ludwigshafen, Germany
Sand, Sigma-Aldrich, St. Louis, Mo.
Clay fines slurry, BASF montmorillonite (F-100)

Example 19

Basic Procedure

Figure 3B:
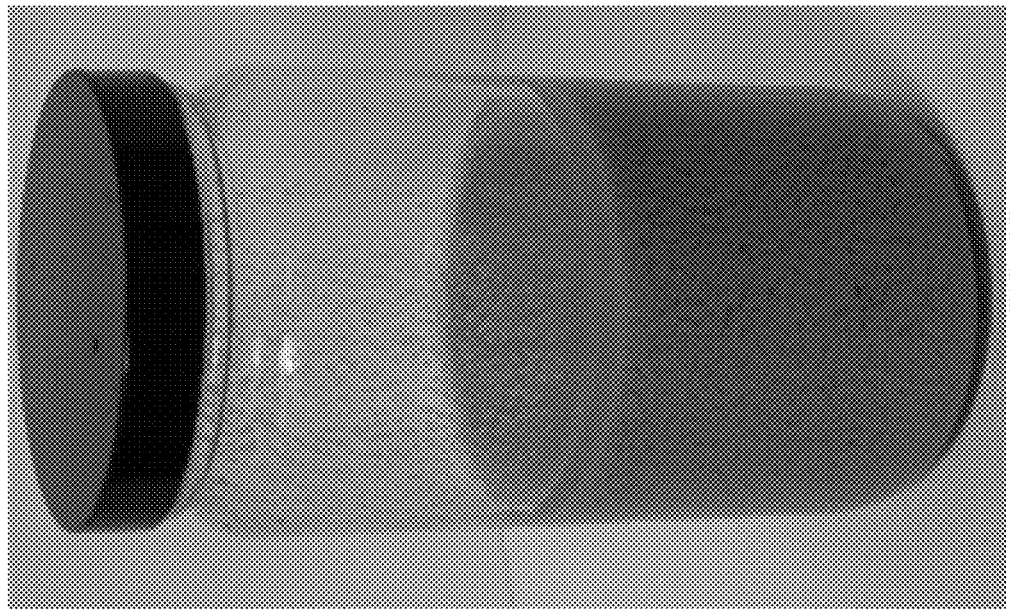
FIG. 3B shows the suspension of clay fines after adding an activator polymer.
Figure 3A:
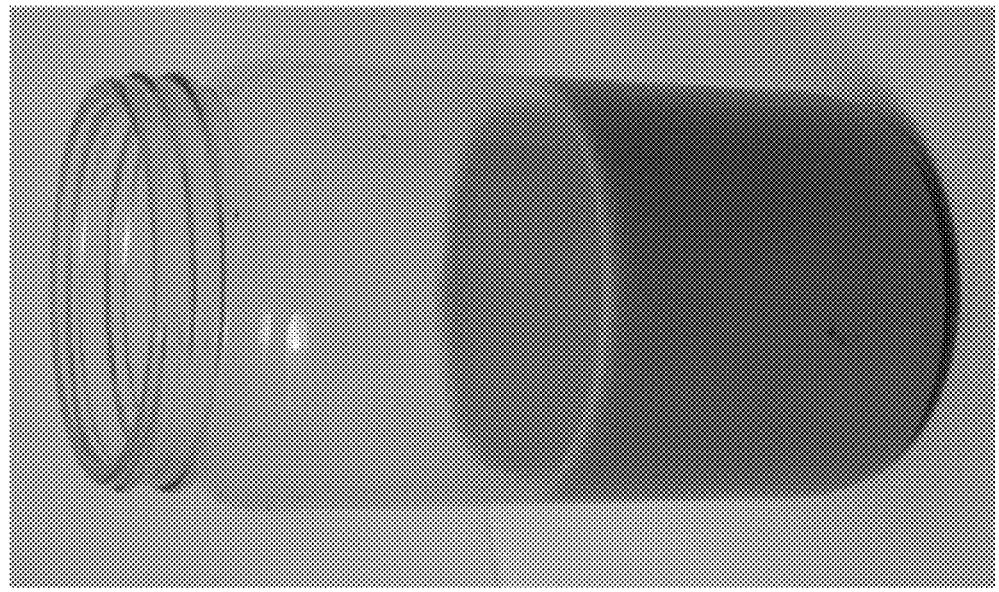
FIG. 3A shows a suspension of clay fines containing 5% by weight solids.
Figure 4:
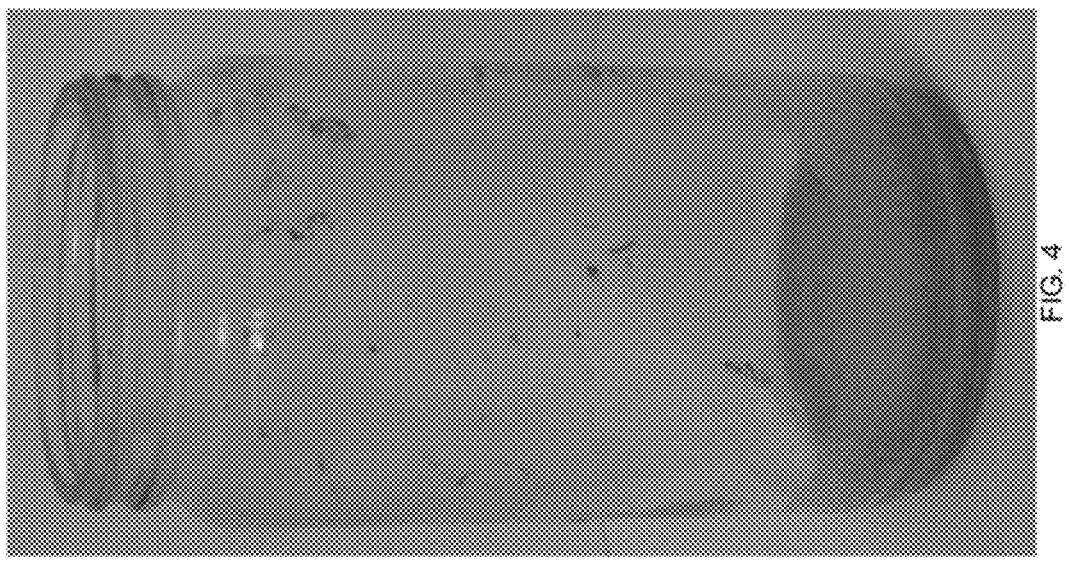
FIG. 4 shows an 85% by weight sand slurry.

A clay fines suspension, shown in FIG. 3A, was prepared from a 25 wt % slurry of montmorrilonite in water made by mixing in a Silverson L4RT-A homogenizer at 5,000 rpm for one hour. The 25 wt % slurry was diluted down to a 5% solids by weight of clay to simulate the clay fines suspension (tailings) produced during phosphate beneficiation. A 250 gm. sample of the 5 wt % clay fines suspension was activated by adding an amount of a 0.1% solution of Magnafloc LT30 as the activator polymer, as detailed in the Examples below. After the activator was added, the sample was agitated by pouring it between two beakers (up to six times) to ensure good mixing. Flocs were evident following this mixing, as shown in FIG. 3B. Separately, a slurry of sand "anchor particles" in water was prepared by adding sand to water as detailed in the Examples below to produce an 85% by weight sand slurry, as shown in FIG. 4. Various amounts of 1% PDAC were added to the sand slurry as the tether polymer, so that tether-bearing anchor particles were produced. The activated clay fines and the tether-bearing anchor particles were combined in a jar and sealed with a lid. The jar was inverted five times to mix the two fluid streams. The contents of the jar were then poured onto an 80-mesh screen and allowed to gravity-filter for one minute. After one minute, a sample of the filtered-out solids was analyzed on an A&D ML-50 moisture balance to determine the solids content. The turbidity of the filtrate was also determined.

Example 20

1:1 Sand-to-Clay

Figure 5:
FIG. 5 shows the result of mixing an activated clay fines stream with a slurry containing tether-bearing sand anchor particles.
Figure 6B:
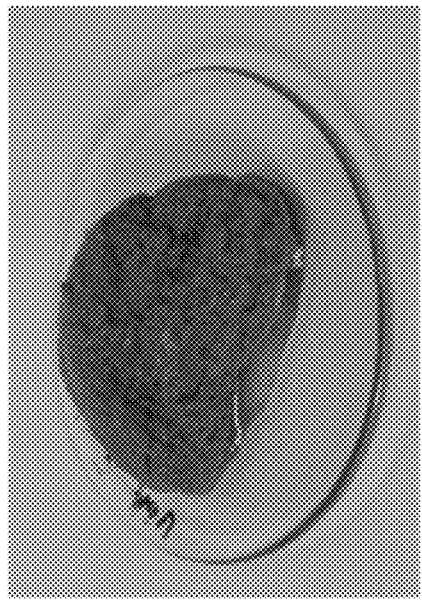
FIG. 6B shows the filtered solids from the filtration shown in FIG. 6A.
Figure 6A:
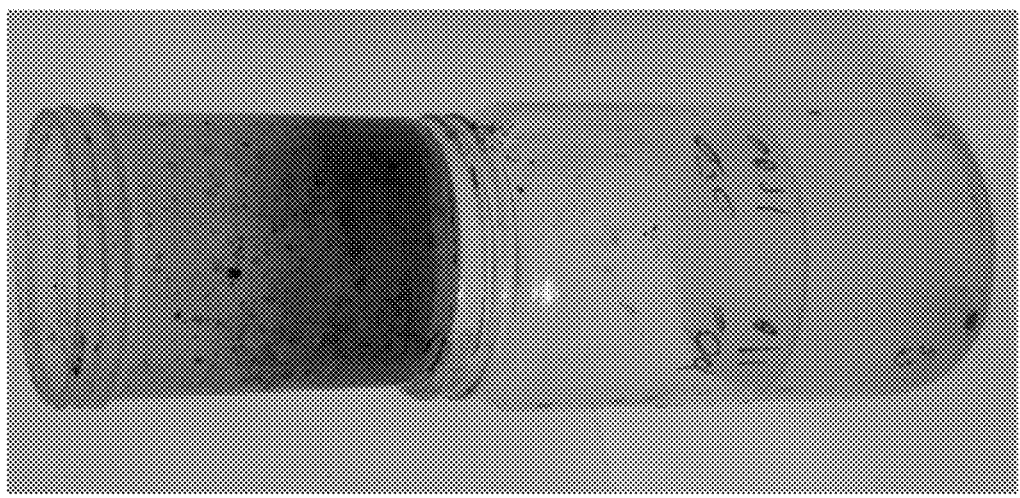
FIG. 6A shows the separation of the mixture in FIG. 5 by gravity filtration.

The following materials were used in accordance with the procedure set forth in Example 19:
Clay Fines Stream
   a. 250 g of 5% clay fines suspension
   b. 12.5 g of 0.1% activator polymer
Sand Stream
   a. 12.5 g of sand
   b. 2.2 g of water
   c. 1.25 g of 1% tether polymer The filtered-out solid sample contained 30.1% solids, and the filtrate had a turbidity of 87 NTU. FIG. 5 shows the mixed fluid streams in the jar immediately after combination. FIG. 6A shows the mixture following filtration, with recovered solids and clear filtrate. FIG. 6B shows the recovered solids.

Example 21

No Sand Stream

The following materials were used in accordance with the procedure set forth in Example 19:
Clay Fines Stream
   a. 250 g of 5% clay fines suspension
   b. 12.5 g of 0.1% activator polymer
(No sand stream)

No solids were retained on the 80-mesh screen. After settling for one minute the supernatant had a turbidity above detection limits (>1000 NTU).

Example 22

Tethered Sand, no Activator

The following materials were used in accordance with the procedure set forth in Example 19:
Clay Fines Stream
   a. 250 g of 5% clay fines suspension
Sand Stream
   a. 12.5 g of sand
   b. 2.2 g of water
   c. 1.25 g of 1% tether polymer No solids were retained on the 80-mesh screen. After settling for one minute the supernatant had a turbidity above detection limits (>1000 NTU).

Example 23

Only Tether Polymer, Without Sand

The following materials were used in accordance with the procedure set forth in Example 19:
Clay Fines Stream
   a. 250 g of 5% clay fines suspension
   b. 12.5 g of 0.1% activator polymer
Sand Stream: 1.25 g of 1% tether polymer alone, without attachment to sand The filtered-out solid contained 13.2% solids, and the supernatant had a turbidity of 13.5 NTU. Only about 10% of the generated solids were retained on the 80-mesh screen.

Example 24

Plain Sand, no Tether

The following materials were used in accordance with the procedure set forth in Example 19:
Clay Fines Stream
   a. 250 g of 5% clay fines suspension
   b. 12.5 g of 0.1% activator polymer
Sand Stream: 12.5 g of sand The filtered-out solid contained 27.2% solids, and the turbidity of the filtrate was 509 NTU. Only about 5% of the solids were retained on the 80-mesh screen.

Example 25

1:1 Sand-to-Clay, Low Polymer Dosing

The following materials were used in accordance with the procedure set forth in Example 19:
Clay Fines Stream
   a. 250 g of 5% clay fines suspension
   b. 6.3 g of 0.1% activator
Sand Stream
   a. 12.5 g of sand
   b. 2.2 g of water
   c. 0.3 g of 1% tether The filtered-out solid contained 33.7% solids and the supernatant had a turbidity of 77 NTU. Thus it is possible with low polymer dosing to generate solids with good solids content and clear water in the supernatant.

Example 26

1:1 Sand-to-Clay, Constant Activator Polymer Amount, Varying Amounts of Tether Polymer The following materials were used in accordance with the procedure set forth in Example 19:
Clay Fines Stream
  a. 250 g of 5% clay fines suspension slurry
  b. 12.5 g of 0.1% activator
Sand Stream
  a. 12.5 g of sand
  b. 2.2 g of water
  c. 1% tether solution, at doses of about 250 ppm, about 500 ppm, about 1000 ppm and about 2000 ppm.

Figure 7:
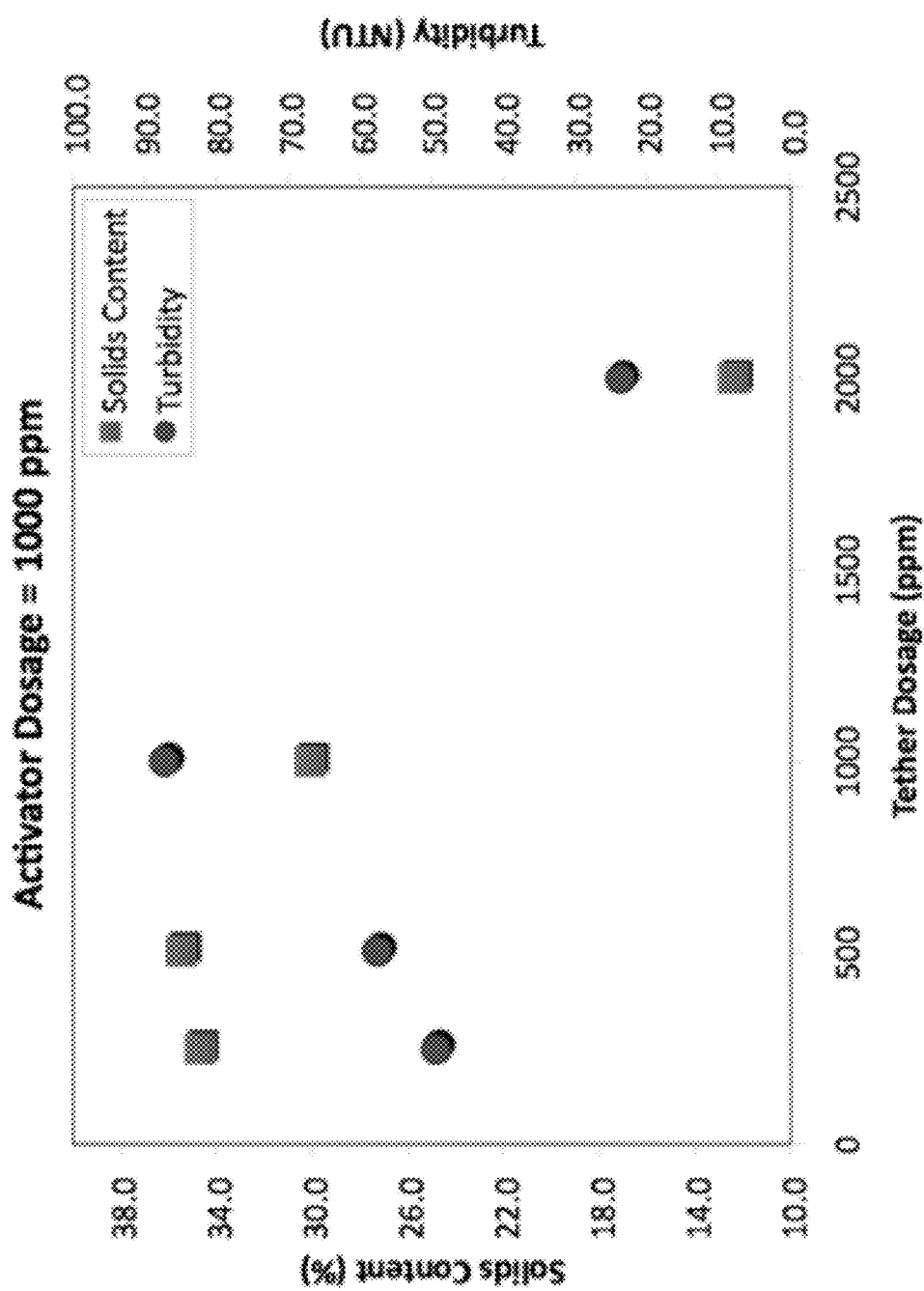
FIG. 7 presents Graph 1 showing Solids Content (%) and Turbidity (NTU) as a function of tether dosage (ppm).

The results are shown in Graph 1 on FIG. 7. At a constant activator dosage of 1000 ppm, the solids generated by using varying amounts of tether to modify the sand produce decrease in solids content above a tether dosage of around 500 ppm. Turbidity values vary in a less consistent manner, but can still be manipulated by varying tether dosage. This demonstrates that varying the tether dosage can improve the solids retrieval from the clay fines stream.

Example 27

Figure 8:
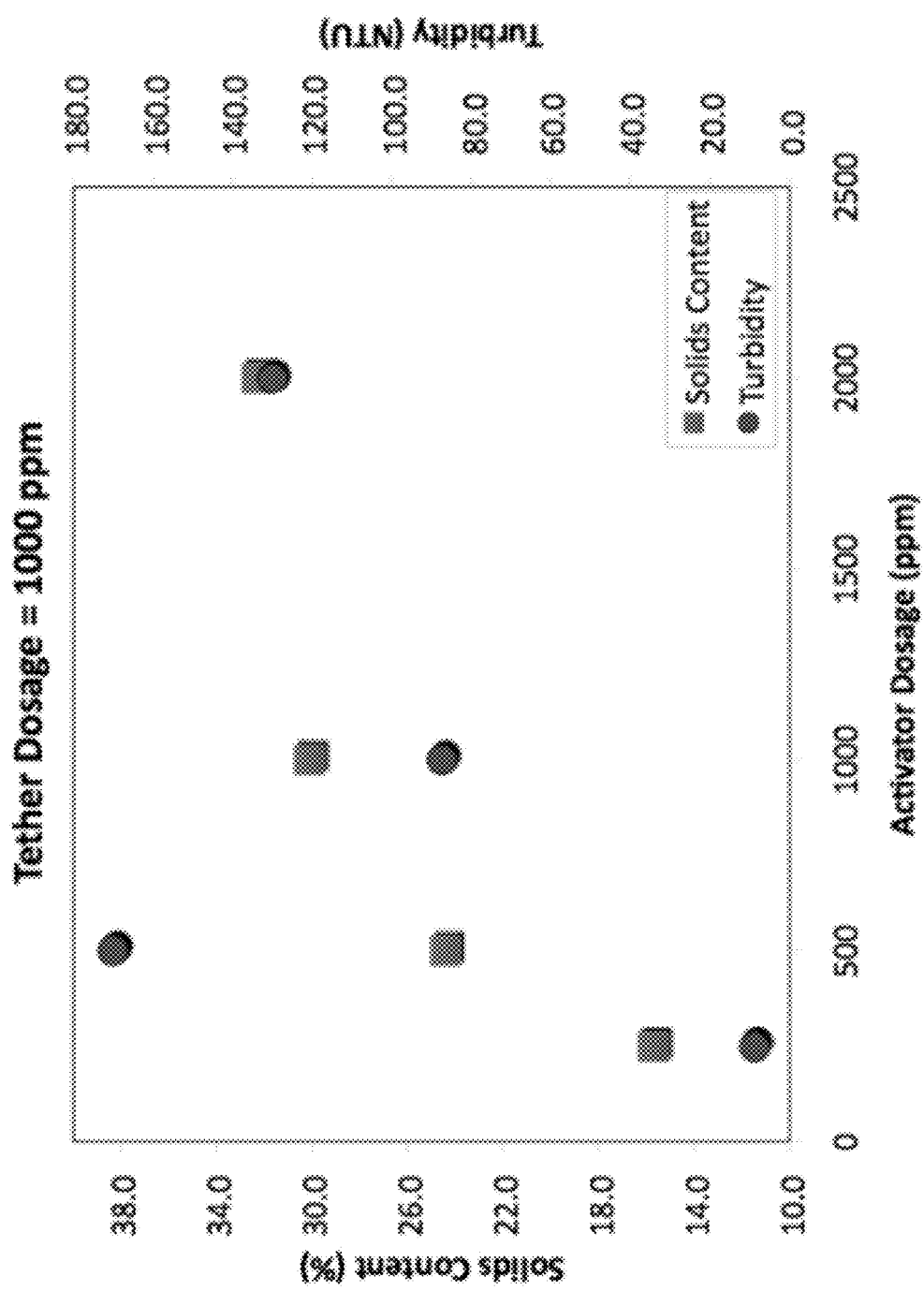
FIG. 8 presents Graph 2 showing Solids Content (%) and Turbidity (NTU) as a function of activator dosage (ppm).

1:1 Sand-to-Clay, Constant Tether Polymer Amount, Varying Amount of Activator Polymer The following materials were used in accordance with the procedure set forth in Example 19:
Clay Fines Stream
  a. 250 g of 5% clay fines suspension
  b. 0.1% activator solution, at doses of about 250 ppm, about 500 ppm, about 1000 ppm, and about 2000 ppm
Sand Stream
  a. 12.5 g of sand
  b. 2.2 g of water
  c. 1.25 g of 1% tether The results are shown in Graph 2 on FIG. 8. At a constant tether dosage of 1000 ppm, the solids generated by using varying amounts of activator increase with increasing activator dosage, but appear to level out around by 2,000 ppm. Thus, the activator dosage can also be used as a way to modulate the solids content of the consolidated clay.

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

What is claimed is:

1. A method of removing particulate matter from a waste tailing fluid, comprising:
  providing an activating material capable of being affixed to the particulate matter wherein the activating material is an anionic or a cationic polymer;
  affixing the activating material to the particulate matter to form activated particles in the fluid;
  providing anchor particles and providing a tethering material capable of being affixed to the anchor particles, wherein the tethering material is a cationic or an anionic polymer;
  attaching the tethering material to the anchor particles to form tether-bearing activated particles and adding the tether-bearing anchor particles to the fluid, wherein the tethering material attaches to the activated particles to form removable complexes in the fluid; and
  removing the removable complexes from the fluid, thereby removing the particulate matter from the waste tailing fluid;
  wherein the fluid is a waste tailing fluid derived from energy production or a mining process; and when the activating material is an anionic polymer, the tethering material is a cationic polymer and when the activating material is a cationic polymer, the tethering material is an anionic polymer; and the anchor particles are larger than the particulate matter.

2. The method of claim 1, wherein the mining process is coal mining.

3. The method of claim 1, wherein the mining process is the mining of an inorganic ore.

4. The method of claim 1, wherein the mining process is the processing or beneficiation of an ore.

5. The method of claim 4, wherein the ore is selected from the group consisting of iron, trona, phosphate, kaolin, bauxite and potash.

6. The method of claim 1, wherein the particulate matter is selected from the group consisting of coal combustion products, coal fines, clay particles and mineral particles.

7. The method of claim 6, wherein the particulate matter is coal combustion products.

8. The method of claim 7, wherein the coal combustion products are selected from the group consisting of fly ash, bottom ash, boiler slag, flue gas desulfurization material and a combination of any of thereof.

9. The method of claim 1, wherein the particulate matter has a mass mean diameter less than about 50 microns.

10. The method of claim 6, wherein the particulate matter has a mass mean diameter less than about 50 microns.

11. The method of claim 1, wherein the fluid is selected from the group consisting of red mud fluid stream, gangue, slurry containing fine particulate kaolin, tailings from trona mining and slurry produced by phosphate beneficiation.

12. The method of claim 1, wherein the removable complex is removed by a process selected from the group consisting of filtration, centrifugation or gravitational settling.

13. The method of claim 1, wherein the anchor particles comprises sand.

14. The method of claim 1, wherein the tethering material is selected from the group consisting of polyvinylamine, branched polyethyleneimine (BPEI), polydimethyldiallylammonium chloride (PDAC), and polydiallyldimethylammonium chloride (pDADMAC).

15. The method of claim 14, wherein the tethering material is chitosan and the activating material is an anionic material.

16. The method of claim 1, wherein the particulate matter comprises quartz, clay fines or a combination thereof.

17. The method of claim 1, wherein the activated particle attaches to the tethering material by electrostatic interaction, hydrogen bonding or hydrophobic behavior.

18. The method of claim 1, wherein the activating material is a polyanion and the tethering material is polycation.

19. The method of claim 1, wherein the activating material is a polycation and the tethering material is a polyanion.

20. The method of claim 1, wherein the particles comprise oil sands.

21. The method of claim 1, wherein the complex is mechanically stable.

22. The method of claim 1, further comprising the step of constructing a road or dyke with the complex.

23. The method of claim 1, further comprising the step of reclaiming land with the complex.

24. A method of removing particulate matter from a fluid, comprising:
adding an anionic polymer to the fluid, thereby coating the particulate matter with the polymer;
providing modified particles comprising particles functionalized by attachment of at least one amine functional group wherein the modified particles are larger than the particulate matter; adding the modified particles to the fluid;
dispersing the modified particles within the fluid so that they contact the coated particulate matter to form removable complexes in the fluid; and
removing the removable complexes from the fluid wherein the fluid is a waste tailing fluid derived from energy production or a mining process.

25. The method of claim 24, wherein the removable complexes are removed by a process selected from the group consisting of filtration, centrifugation, skimming and gravitational settling.

26. The method of claim 24, wherein the particulate matter comprises quartz, clay fines or a combination thereof.

27. The method of claim 24, wherein the method is conducted as the waste tailing fluid is generated.

28. The method of claim 24, wherein the fluid is an existing tailings pond.

29. The method of claim 24, wherein the particles comprise oil sands.

30. The method of claim 24, wherein the complex is mechanically stable.

31. The method of claim 24, further comprising the step of constructing a road or dyke with the complex.

32. The method of claim 24, further comprising the step of reclaiming land with the complex.

33. A method for removing coal fines from a fluid, comprising:
providing a fluid containing a population of suspended coal fines;
adding an activator polymer to the fluid to complex with the suspended coal fines to form activated coal fines, the activated coal fines residing within the fluid volume,
providing an anchor particle complexed with a tethering agent to form tether-bearing anchor particles wherein the anchor particles are larger than the coal fines;
adding the tether-bearing anchor particles to the fluid volume to contact the activated coal fines, the tether-bearing anchor particles being capable of complexing with the activated coal fines to form complexes removable from the fluid,
removing the complexes from the fluid;
wherein when the activator polymer is an anionic polymer, the tethering agent is a cationic polymer and when the activator polymer is a cationic polymer, the tethering agent is an anionic polymer.

34. The method of claim 33, wherein the anchor particle comprises coal.

35. The method of claim 34, wherein the anchor particle comprises filter cake coal.

36. The method of claim 34, wherein the anchor particle comprises coal product refuse.

37. The method of claim 33, wherein the anchor particle comprises a non-combustible material.

38. The method of claim 33, wherein the anchor particle comprises a mineral.

39. A method for removing coal fines from a fluid, comprising:
providing an activator polymer capable of interacting with a population of coal fines suspended in a fluid wherein the activator polymer is an anionic or a cationic polymer;
adding the activator polymer to the population to form activated coal fines;
providing anchor particles wherein the anchor particles are larger than the coal fines;
complexing the anchor particles with a tethering agent capable of complexing with the activated coal fines, thereby forming tether-bearing anchor particles, wherein the tethering agent is a cationic or an anionic polymer;
adding the tether-bearing anchor particles with the activated coal fines to the fluid to form complexes removable from the fluid, the complexes comprising a composite material comprising coal fines and anchor particles;
removing the composite material from the fluid; and
wherein when the activator polymer is an anionic polymer, the tethering agent is a cationic polymer and when the activator polymer is a cationic polymer, the tethering agent is an anionic polymer.

40. The method of claim 39, wherein the tethering material is polydiallyldimethylammonium chloride (pDADMAC).

41. The method of claim 39, wherein the anchor particle comprises coal.

42. The method of claim 39, wherein the anchor particle comprises filter cake coal.

43. The method of claim 39, wherein the anchor particle comprises a non-combustible material.

44. The method of claim 39, wherein the anchor particle is combustible.

45. The method of claim 39, wherein the anchor particle is a starch particle.

* * * * *